United States Patent [19]

Ogawa

[11] Patent Number: 5,422,735
[45] Date of Patent: Jun. 6, 1995

[54] IMAGE PROCESSING METHOD AND IMAGE PROCESSING APPARATUS

[75] Inventor: Nobuo Ogawa, Kawasaki, Japan

[73] Assignee: Fujitsu Limited, Kawasaki, Japan

[21] Appl. No.: 250,506

[22] Filed: May 27, 1994

[30] Foreign Application Priority Data

Sep. 16, 1993 [JP] Japan .................. 5-230527

[51] Int. Cl.6 ............................................ H04N 1/405
[52] U.S. Cl. ...................................... 358/456; 358/465
[58] Field of Search ............ 358/456, 465, 457, 458, 358/466, 455; 382/50

[56] References Cited

U.S. PATENT DOCUMENTS

| 4,710,822 | 12/1987 | Matsunawa | 358/465 |
| 4,853,792 | 8/1989 | Katsuta et al. | 358/455 |
| 4,975,786 | 12/1990 | Katayama et al. | 358/457 |

FOREIGN PATENT DOCUMENTS

| 59-54376 | 3/1984 | Japan . |
| 63-174470 | 7/1988 | Japan . |
| 3-149967 | 6/1991 | Japan . |

Primary Examiner—Scott A. Rogers
Attorney, Agent, or Firm—Staas & Halsey

[57] ABSTRACT

The invention provides an image processing method and an image processing apparatus suitably applied to an image reading apparatus such as an OCR or a facsimile, by which a drop or a break of a thin line which is caused by a little inclination of an original can be prevented with certainty by a simple processing procedure without emphasizing noise and besides sharp binary digitization processing which does not cause blurring or distortion can be performed even where color characters are present discretely in the original. When a density value of a noticed picture element upon binary processing is lower than a predetermined threshold level, a binary value error of a picture element on the opposite side to the noticed picture element in a main scanning direction or a sub scanning direction is added to the density value of the noticed picture element to obtain a sum value, and the sum value is compared with the predetermined threshold level. When the sum value is equal to or higher than the predetermined threshold level, binary digitization is performed for the noticed picture element.

12 Claims, 15 Drawing Sheets

Xi, j : DIGITAL DENSITY VALUE OF NOTICED PICTURE ELEMENT

FIG. 17 PRIOR ART
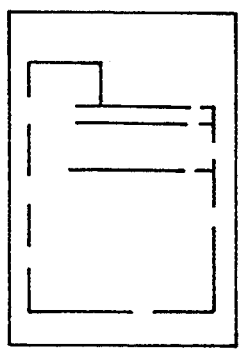
FIG. 18 PRIOR ART
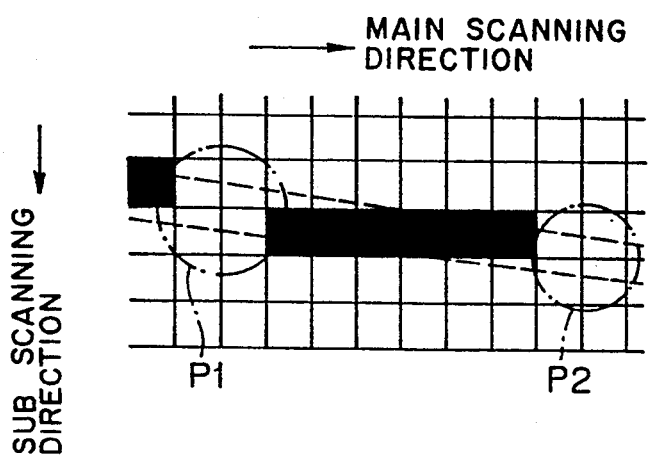
FIG. 19 PRIOR ART
| A | B | C |
|---|---|---|
| D | E | F |
| G | H | I |

IMAGE PROCESSING METHOD AND IMAGE PROCESSING APPARATUS

BACKGROUND OF THE INVENTION

1. Field of the Invention

This invention relates to an image processing method and an image processing apparatus suitably applied to an image reading apparatus such as an OCR (Optical Character Reader) or a facsimile, and more particularly to an image processing method and an image processing apparatus wherein a video signal (density value signal) from an optical sensor such as a CCD (Charge Coupled Device) is converted into a digital signal and the digital signal is processed by binary digitization processing to obtain binary values of white and black.

2. Description of the Related Art

In recent years, it is a common practice with an image reading apparatus such as a copying machine or a facsimile to use and scan an optical sensor such as a CCD in a main scanning direction (for example, a lateral direction of an original) and a sub scanning direction (for example, a longitudinal direction of an original) and process the thus read image data by digital processing.

When the apparatus of the type described is used to read a document or a drawing on which a longitudinal or lateral straight line such as, for example, a ruled line shown in FIG. 15, if the line is inclined a little relative to the main scanning direction or the sub scanning direction due to inclined arrangement of the original as seen in FIG. 16, then where the line spans over two picture elements in the main scanning direction or the sub scanning direction, the density value detected by the optical sensor is separated between the two picture elements as at a portion P1 or P2 in FIG. 18. Consequently, the density value does not reach a predetermined threshold level, which is used upon binary digitization processing, at any of the two picture elements, and the two picture elements are determined to be both white.

Consequently, the line of the image exhibits a partial drop of drops as seen in FIGS. 17 and 18, resulting in significant visual deterioration in picture quality. It is to be noted that, in FIGS. 16 and 18, each square represents a picture element as a minimum unit for which a density value is detected by an optical sensor, and the rightward direction in FIGS. 16 and 18 is the main scanning direction while the downward direction in FIGS. 16 and 18 is the sub scanning direction.

In order to prevent such a drop of a straight line as described above, an image reading apparatus employs contour emphasis processing by MTF (Modulation Transfer Function) correction. In the contour emphasis processing, if it is assumed that, for example, the density values of picture elements of a 3×3 matrix are represented by A to I as seen in FIG. 19 and the noticed picture element which makes an object for binary digitization processing is the center picture element having the density value E, the density value of the noticed picture element is given, using the density values of the eight picture elements around the picture element, by the following expression (1):

$$|E-(A+B+C+D+F+G+H+I)/8| \times \alpha + E \qquad (1)$$

where $\alpha$ is a predetermined constant.

Meanwhile, as a result of the progress of image processing apparatus in recent years, even it is possible to handle images close to natural pictures such as multi-value images or color images. However, in such practical industries as the OA (Office Automation) industry, binary images of white and black are handled mainly. This is because almost all objects for an image to be handled are characters. Although such a color as red or blue is used partially for the object of emphasis in materials for explanation, if many different colors are used, then it is less easy to recognize the image, and accordingly, there is some limitation in number of colors which may be used.

Although there is no particular problem when a document which involves some note written in red or blue is read by a person, if it is tried to read the document by an OCR or a facsimile which is designed to read a binary image of white and black, then a color of red becomes blurred whereas a color of green cannot be read. Even if a color scanner is employed, since normally a color sensor includes sensors for R, G, and B (red, green and blue) arranged successively in an order, the locations read by the individual color sensors are delicately different from each other. Consequently, such a character as a Chinese character is distorted even where the character is of the 12 point size, and cannot be used for an OCR or cannot be read readily by a facsimile.

Therefore, it is a popular measure to adjust the threshold level to be used for binary digitization processing based on a read density value as disclosed in Japanese Patent Laid-Open Application No. Showa 59-54376 or to employ contour emphasis processing in order to artificially adjust blurring or distortion.

With the image processing method described above, however, if such contour emphasis processing as described above is performed in accordance with the equation (1) above, also noise is emphasized; and accordingly, correction by a great amount cannot be performed. Meanwhile, although it may seem a promising idea to increase the resolution of the sensor, the apparatus becomes expensive and besides the amount of image data to be processed is increased. Accordingly, the idea does not provide a direct solution.

Further, when it is tried to perform, upon reading of an original printed in two colors or a like original, artificial adjustment by threshold level adjustment or contour emphasis processing, it sometimes occurs that, even if one of the two colors can be read with certainty, the other color cannot be read with certainty. Accordingly, when a document image in which two or more colors are used is read as a binary image of white and black, particularly where color characters are present discretely in a document, a sharp character image cannot be produced.

SUMMARY OF THE INVENTION

It is an object of the present invention to provide an image processing method and an image processing apparatus by which a drop or a break of a thin line which is caused by a little inclination of an original can be prevented with certainty by a simple processing procedure without emphasizing noise.

It is another object of the present invention to provide an image processing method and an image processing apparatus by which sharp binary digitization processing which does not cause blurring or distortion can be performed even where color characters are present discretely in an original.

In order to attain the objects described above, according to an aspect of the present invention, there is provided an image processing method which involves binary digitization processing wherein density values obtained from a sensor, which is provided for scanning image data in a main scanning direction and a perpendicular subscanning direction to detect a density value of the image data for each picture element, are compared for the individual picture elements with a threshold level to convert each of the density values into one of two binary values of white and black, comprising the steps of adding, when, upon such binary digitization processing, the density value of a noticed picture element is lower than the threshold level, a binary value error of a picture element on the opposite side to the noticed picture element in the main scanning direction or the sub scanning direction to the density value of the noticed picture element to obtain a sum value, comparing the sum value with the threshold level, and outputting, when the sum value is equal to or higher than the threshold level, a black signal for the noticed picture element.

According to another aspect of the present invention, there is provided an image processing method which involves binary digitization processing wherein density values obtained from a sensor, which is provided for scanning image data in a main scanning direction and a perpendicular subscanning direction to detect a density value of the image data for each picture element, are compared for the individual picture elements with a threshold level to convert each of the density values into one of two binary values of white and black, comprising the steps of adding, when, upon such binary digitization processing, the density value of a noticed picture element is lower than the threshold level, a binary value error of a picture element on the opposite side to the noticed picture element in the main scanning direction to the density value of the noticed picture element to obtain a first sum value and adding another binary value error of another picture element on the opposite side to the noticed picture element in the sub scanning direction to the density value of the noticed picture element to obtain a second sum value, comparing the first sum value and the second value with the threshold level, and outputting, when at least one of the first sum value and the second sum value is equal to or higher than the threshold level, a black signal for the noticed picture element. The threshold level for comparison may be set to different values for the first sum value and the second sum value.

The image processing methods may be constructed such that, the binary value error is set to "0" when a binary digitization value of the picture element having the binary value error is a black signal, but when the binary digitization value of the picture element having the binary value error is a white signal, the binary value error is set to the density value of the picture element before binary digitization processing.

According to a further aspect of the present invention, there is provided an image processing apparatus, which comprises a sensor for scanning image data in a main scanning direction and a perpendicular sub scanning direction to detect a density value of the image data for each picture element, and binary digitization means for comparing the density values obtained from the sensor for the individual picture elements with a threshold level to convert each of the density values into one of two binary values of white and black, the binary digitization means including first comparison means for comparing the density value of a noticed picture element with the threshold level and outputting a black signal when the density value of the noticed picture element is equal to or higher than the threshold level, storage means for storing a binary value error of a picture element on the opposite side to the noticed picture element in the main scanning direction or the sub scanning direction, addition means for adding, when the first comparison means determines that the density value of the noticed picture element is lower than the threshold level, the binary value error stored in the storage means to the density value of the noticed picture element, second comparison means for comparing the result of addition by the addition means with the threshold level and outputting a black signal when the result of addition is equal to or higher than the threshold level; and a logical OR gate for logically ORing an output of the first comparison means and an output of the second comparison means with each other and outputting the result of logical ORing as a result of binary digitization processing.

According to a still further aspect of the present invention, there is provided an image processing apparatus, which comprises a sensor for scanning image data in a main scanning direction and a perpendicular sub scanning direction to detect a density value of the image data for each picture element, and binary digitization means for comparing the density values obtained from the sensor for the individual picture elements with a threshold level to convert each of the density values into one of two binary values of white and black, the binary digitization means including first comparison means for comparing the density value of a noticed picture element with the threshold level and outputting a black signal when the density value of the noticed picture element is equal to or higher than the threshold level, first storage means for storing a binary value error of a picture element on the opposite side to the noticed picture element in the main scanning direction, second storage means for storing a binary value error of another picture element on the opposite side to the noticed picture element in the sub scanning direction, first addition means for adding, when the first comparison means determines that the density value of the noticed picture element is lower than the threshold level, the binary value error of the picture element on the opposite side to the noticed picture element in the main scanning direction stored in the first storage means to the density value of the noticed picture element, second addition means for adding, when the first comparison means determines that the density value of the noticed picture element is lower than the threshold level, the binary value error of the picture element on the opposite side to the noticed picture element in the sub scanning direction stored in the second storage means to the density value of the noticed picture element, second comparison means for comparing the result of addition by the first addition means with the threshold level and outputting a black signal when the result of addition is equal to or higher than the threshold level, third comparison means for comparing the result of addition by the second addition means with the threshold level and outputting a black signal when the result of addition is equal to or higher than the threshold level, and a logical OR gate for logically ORing an output of the first comparison means, an output of the second comparison means and an output of the third comparison means and outputting the result of logical ORing as a result of binary digitization processing. The threshold level for comparison may be set to different values for the second comparison means and the third comparison means.

Both of the image processing apparatus may be constructed such that the binary value error is set to "0" when a binary digitization value of the picture element having the binary value error is a black signal, but when the binary digitization value of the picture element having the binary value error is a white signal, the binary value error is set to the density value of the picture element before binary digitization processing.

With the image processing methods and the image processing apparatus, when the noticed picture element has a density value lower than the threshold level, a binary value error of a picture element on the opposite side to the noticed picture image in the main scanning direction or the sub scanning direction is added to the density value of the noticed picture element to obtain a sum value and the sum value is compared with the threshold level to effect binary value determination of the threshold value between white and black thereby to restore the density value of the thin line divided into two picture elements. Consequently, the image processing methods and the image processing apparatus are advantageous in that a drop or a break of a thin line which is caused by a little inclination of an original can be prevented with certainty by a simple processing procedure without emphasizing noise.

According to a yet further aspect of the present invention, there is provided an image processing method wherein analog density values obtained from a sensor, which detects a density value of image data for each picture element, are converted into digital density values by analog to digital conversion means, which converts analog density values obtained from the sensor into digital density values of a fixed number of bits for a conversion density range, and the digital density values thus obtained are compared for the individual picture elements with a threshold level to convert each of the digital density values into one of two binary values of white and black, comprising the steps of producing a histogram of density values of a noticed picture element and picture elements around the noticed picture element, setting a conversion density range for the noticed picture element in response to a density range of a peak appearing in the histogram, and converting a digital density value of the noticed picture element from the analog to digital conversion means into another digital density value using a scale obtained by dividing the set conversion density range by a number provided by the fixed number of bits.

According to a yet further aspect of the present invention, there is provided an image processing method wherein analog density values obtained from a sensor, which detects a density value of image data for each picture element, are converted into digital density values by analog to digital conversion means, which converts analog density values obtained from the sensor into digital density values of a fixed number of bits for a conversion density range, and the digital density values thus obtained are compared for the individual picture elements with a threshold level to convert each of the digital density values into one of two binary values of white and black, comprising the steps of producing a histogram of density values of a noticed picture element and picture elements around the noticed picture element, modifying the conversion density range of the analog to digital conversion means in response to a density range of a peak appearing in the histogram, and converting, by the analog to digital conversion means, an analog density value of the noticed picture element into a digital density value using a scale obtained by dividing the modified conversion density range by a number provided by the fixed number of bits.

According to a yet further aspect of the present invention, there is provided an image processing apparatus, which comprises a sensor for detecting a density value of image data for each picture element, analog to digital conversion means for converting analog density values obtained from the sensor into digital density values of a fixed number of bits for a conversion density range, binary digitization means for comparing the digital density values from the analog to digital conversion means for the individual picture elements with a threshold level to convert each of the digital density values into one of two binary values of black and white, histogram production means for producing a histogram of density values of a noticed picture element and picture elements around the noticed picture element, setting means for setting a conversion density range for the noticed picture element in response to a density range of a peak appearing in the histogram produced by the histogram production means, and conversion means for converting the digital density value of the noticed picture element from the analog to digital conversion means into another digital density value using a scale obtained by dividing the conversion density range set by setting means by a number provided by the fixed number of bits. Preferably, the conversion means includes a lookup table which is used also for a memory for Y conversion.

According to a yet further aspect of the present invention, there is provided an image processing apparatus, which comprises a sensor for detecting a density value of image data for each picture element, analog to digital conversion means for converting analog density values obtained from the sensor into digital density values of a fixed number of bits for a conversion density range, conversion density range setting means for setting the conversion density range of the analog to digital conversion means, binary digitization means for comparing the digital density values from the analog to digital conversion means for the individual picture elements with a threshold level to convert each of the digital density values into one of two binary values of black and white, histogram production means for producing a histogram of density values of a noticed picture element and picture elements around the noticed picture element, and conversion density range modification means for modifying the conversion density range set by the conversion density range setting means in response to a density range of a peak appearing in the histogram produced by the histogram production means. The image processing apparatus may be constructed such that the conversion density range setting means includes ground color level setting means for setting an analog density value corresponding to a ground color of the image data detected by the sensor as a ground color level reference value, high density level setting means for setting an analog density value corresponding to high density side image data detected by the sensor as a high density level reference value, and low density level setting means for setting an analog density value corresponding to low density side image data detected by the sensor as a low density level reference value, and the conversion density range modification means is constructed as change-over means for selecting one of the high density level reference value from the high density level setting means and the low density level reference value from the low density level setting means in response to the density range of the peak appearing in the histogram produced by the histogram production means and outputting the selected reference level to the analog to digital conversion means, the conversion density range for the analog to digital conversion means being set in accordance with the ground color level reference value from the ground color level setting means and the selected reference value from the change-over means.

With the image processing methods and the image processing apparatus, there is an advantage in that, since the density conversion range by the analog to digital conversion means is suitably modified in response to the density range of a peak in the histogram obtained by the histogram production means, even when image data of a document image or a like image in which two or more colors are used are read as a binary image of white and black (even when color characters are present discretely in the document), sharp binary digitization processing which does not cause blurring or distortion can be performed.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 17 is a diagrammatic view illustrating an example of reading of an image in which a break or a drop of a thin line is involved;

FIG. 18 is a diagrammatic view showing, in an enlarged scale, a break or drop of the thin line shown in FIG. 17; and FIG. 19 is a diagrammatic view illustrating contour emphasis processing.

DESCRIPTION OF THE PREFERRED EMBODIMENTS a. Aspects of the Invention

Figure 1:
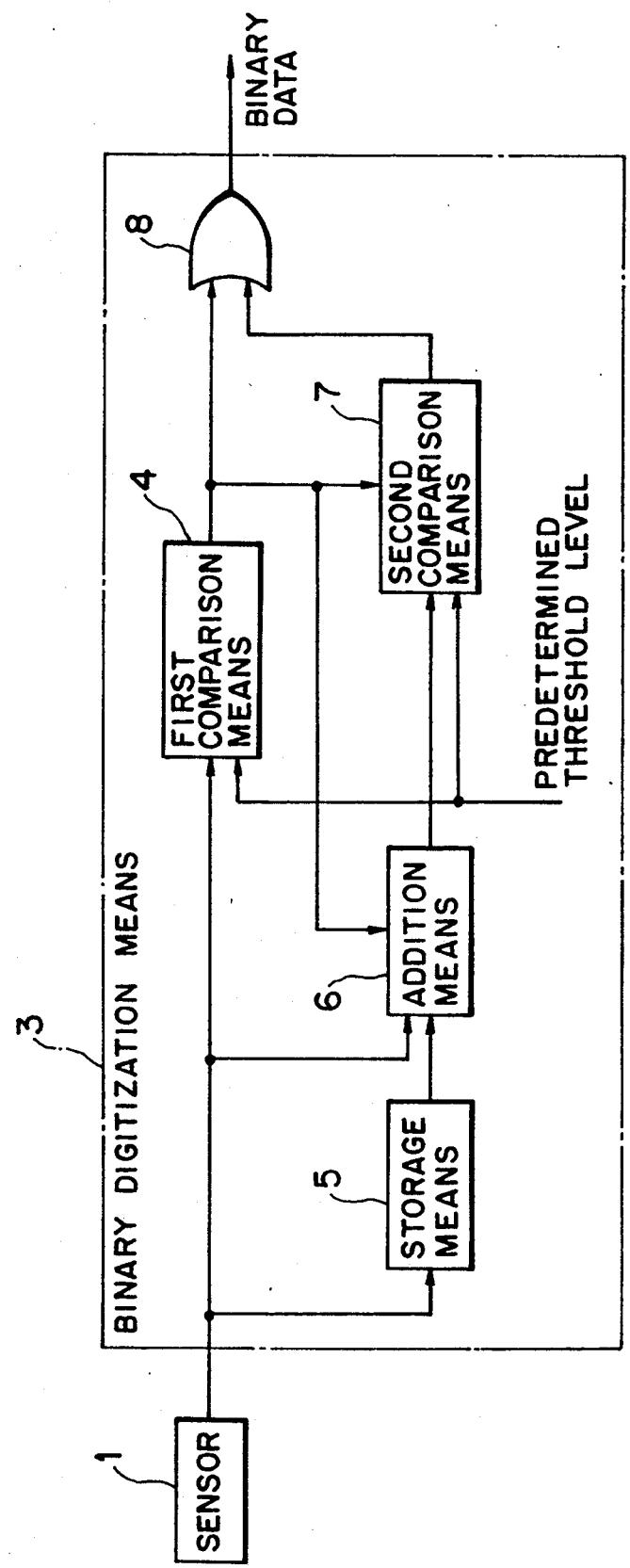
FIG. 1 is a block diagram illustrating an aspect of the present invention.

Referring first to FIG. 1, there is shown an image processing apparatus according to an aspect of the present invention. The image processing apparatus includes a sensor 1 for scanning an original not shown in a main scanning direction and a sub scanning direction to detect the density value of image data for each picture element, and binary digitization means 3 for comparing density values obtained by the sensor 1 for the individual picture elements with a predetermined threshold level to convert each of the density values into one of two binary values of white and black.

The binary digitization means 3 includes first comparison means 4, storage means 5, addition means 6, second comparison means 7, and a logical OR gate 8.

The first comparison means 4 compares the density value of a noticed picture element with the predetermined threshold level and outputs a black signal when the density value of the noticed picture element is equal to or higher than the predetermined threshold level. The storage means 5 stores a binary value error of a picture element on the opposite side to the noticed picture element in the main scanning direction or the sub scanning direction.

The addition means 6 adds, when it is determined by the first comparison means 4 that the density value of the noticed picture element is lower than the predetermined threshold level, the binary value error stored in the storage means 5 to the density value of the noticed picture element. The second comparison means 7 compares the result of addition by the addition means 6 with the predetermined threshold level and outputs a black signal when the result of addition is equal to or higher than the predetermined threshold level. The logical OR gate 8 outputs the result of logical ORing between the output of the first comparison means 4 and the output of the second comparison means 7 as a result of binary digitization processing.

In the image processing method applied to the image processing apparatus described above with reference to FIG. 1, when the binary digitization means 3 tries to effect binary digitization processing wherein density values obtained by the sensor 1 are compared with the predetermined threshold level for the individual picture elements by the binary digitization means 3 to convert each of the density values into one of two binary values of white and black, if it is determined by the first comparison means 4 that the density value of the noticed picture element is lower than the predetermined threshold level, the binary value error of the picture element on the opposite side to the noticed picture element in the main scanning direction or the sub scanning direction stored in storage means 5 is added to the density value of the noticed picture element by the addition means 6.

Then, the sum value obtained by such addition and the predetermined threshold level are compared with each other by the second comparison means 7, and when it is determined that the sum value is equal to or higher than the predetermined threshold level, a black signal is outputted for the noticed picture element. In this instance, the result of logical ORing between the output of the first comparison means 4 and the output of the second comparison means 7 is outputted as a result of binary digitization processing of the binary digitization means 3 from the logical OR gate 8. Consequently, when one of the output of the first comparison means 4 and the output of the second comparison means 7 is a black signal, a black signal is outputted as a result of binary digitization processing for the noticed picture element.

Figure 2:
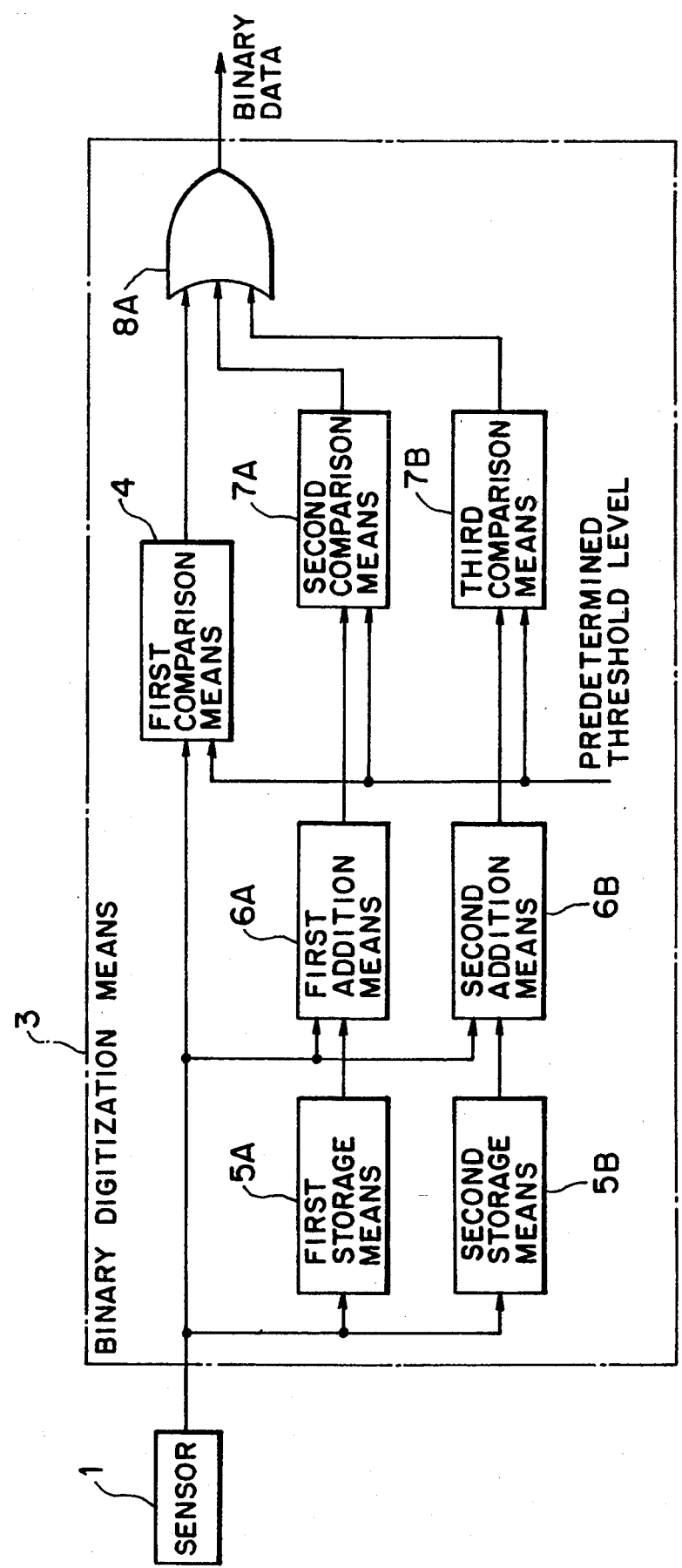
FIG. 2 is a similar view but illustrating another aspect of the present invention.

Referring now to FIG. 2, there is shown an image processing apparatus according to another aspect of the present invention. The image processing apparatus includes a sensor 1 and binary digitization means 3 similarly to the image processing apparatus according to the first aspect of the present invention described above. While the sensor 1 is similar to that of the image processing apparatus of the first aspect, the binary digitization means 3 includes different components. In particular, the binary digitization means 3 of the image processing apparatus of the present aspect includes first comparison means 4, first storage means 5A, second storage means 5B, first addition means 6A, second addition means 6B, second comparison means 7A, third comparison means 7B, and a logical OR gate 8A.

The first comparison means 4 is quite similar to the first comparison means 4 described hereinabove with reference to FIG. 1. Meanwhile, the first storage means 5A and the second storage means 5B store a binary value error of a picture element on the opposite side to a noticed picture element in a main scanning direction and another binary value error of another picture element on the opposite side to the noticed element in a sub scanning direction, respectively.

The first addition means 6A and the second addition means 6B add, when it is determined by the first comparison means 4 that the density value of the noticed picture element is lower than the predetermined threshold level, the binary value errors stored in the first storage means 5A and the second storage means 5B to the density value of the noticed picture element, respectively.

Further, the second comparison means 7A and the third comparison means 7B compare the result of addition (first sum value) by the first addition means 6A and the result of addition (second sum value) by the second addition means 6B with a predetermined threshold level, respectively, and each outputs a black signal when the result of addition is equal to or higher than the predetermined threshold level. The logical OR gate 8A outputs the result of logical ORing between the output of the first comparison means 4 and the outputs of the second comparison means 7A and the third comparison means 7B as a result of binary digitization processing of the binary digitization means 3.

It is to be noted that the predetermined threshold level for the second comparison means 7A and the threshold level for the third comparison means 7B may have different preset values from each other.

Further, in the apparatus described with reference to FIGS. 1 and 2, the binary value error is set to "0" when the binary digitization output for the picture element which has the binary value error is a black signal, but is set to the density value of the picture element before processed by binary digitization processing when the binary digitization output for the picture element is a white signal.

In the image processing method on the apparatus of the second aspect of the present invention described above with reference to FIG. 2, when it is determined by the first comparison means 4 that the density value of a noticed picture element is lower than the predetermined threshold level before binary digitization processing wherein density values obtained from the sensor 1 are compared with the predetermined threshold level for the individual picture elements by means of the binary digitization means 3 to convert each of the density values into one of two binary values of white and black, a first sum value is first calculated by the first addition means 6A by adding a binary value error of a picture element on the opposite side to the noticed picture element in the main scanning direction stored in the first storage means 5A to the density value of the noticed picture element and then the first sum value and the predetermined threshold level are compared with each other by the second comparison means 7A while a second sum value is calculated by the second addition means 6B by adding another binary value error of another picture element on the opposite side to the noticed picture element in the sub scanning direction stored in the second storage means 5B to the density value of the noticed picture element and then the second sum value and the predetermined value are compared with each other by the third comparison means 7B.

Then, when it is determined by the second comparison means 7A or the third comparison means 7B that at least one of the first sum value and the second sum value is equal to or higher than the predetermined threshold level, a black signal is outputted for the noticeable picture element. In this instance, since the result of logical ORing among the output of the first comparison means 4, the output of the second comparison means 7A and the output of the third comparison means 7B is outputted as a result of binary digitization processing of the binary digitization means 3 from the logical OR gate 8A, when any one of the output of the first comparison means 4, the output of the second comparison means 7A and the output of the third comparison means 7B is a black signal, a black signal is outputted as a result of binary digitization processing for the noticed picture element.

Figure 3:
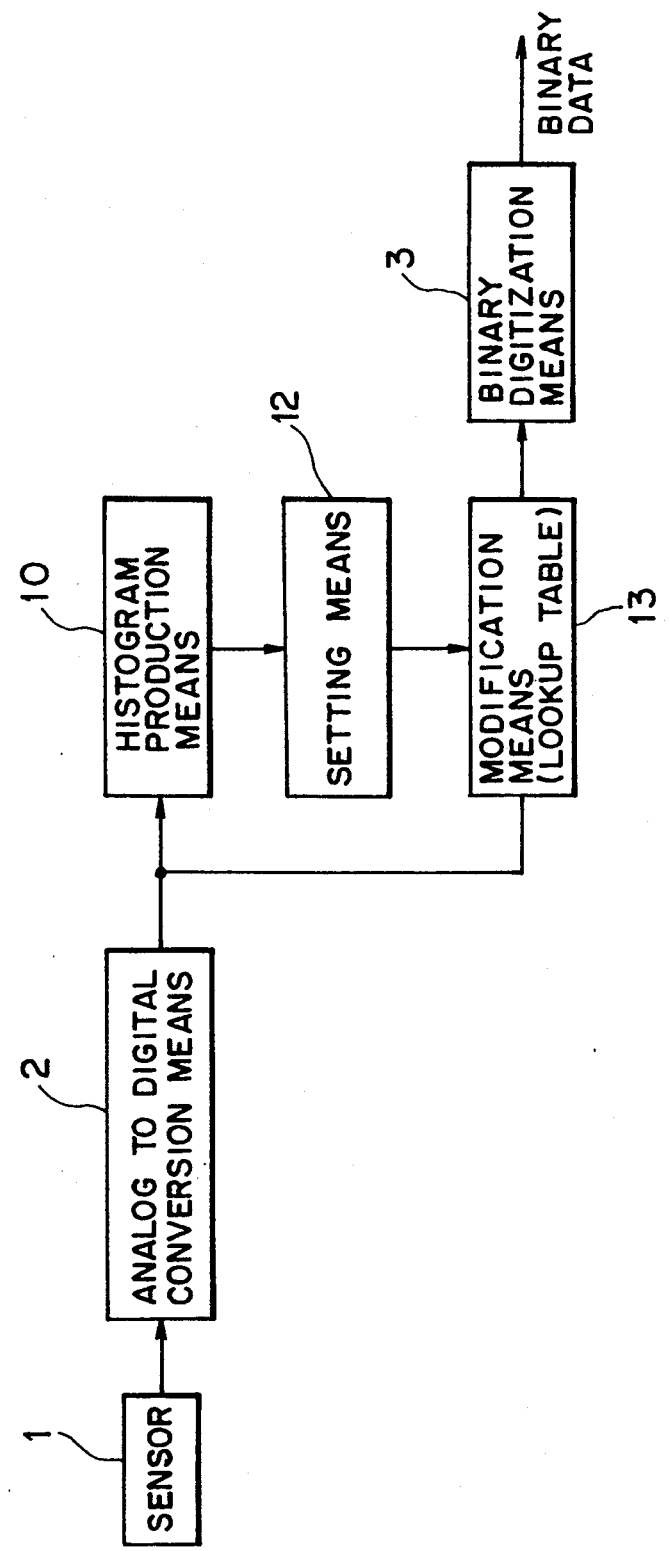
FIG. 3 is a similar view but illustrating a further aspect of the present invention.

Referring now to FIG. 3, there is shown an image processing apparatus according to a further aspect of the present invention. The image processing apparatus includes a sensor 1 similar to that of the image processing apparatus of the first aspect for detecting a density value of image data for each picture element. The image processing apparatus further includes analog to digital conversion means 2 for converting an analog density value obtained from the sensor 1 into digital density values of a predetermined number of bits for a predetermined conversion density range, and binary digitization means 3 for comparing digital density values from the analog to digital conversion means 2 for the individual picture elements with a predetermined threshold level to convert each of the digital density values into one of two binary values of white and black.

The image processing apparatus further includes histogram production means 10 for producing a histogram from density values of a noticed picture element and adjacent picture elements around the noticed picture elements, setting means 12, and modification means 13. The setting means 12 sets a conversion density range for the noticed picture element in response to a density range of a peak appearing in the histogram produced by the histogram production means 10.

The modification means 13 converts the digital density value of the noticed picture element from the analog to digital conversion means 2 for the conversion density range set by the setting means 12 into another digital density value using a scale obtained by dividing the conversion density range by a number provided by the number of bits by which the analog to digital conversion means 2 performs analog to digital conversion. It is to be noted that the modification means 13 can be constituted from a lookup table which may be used also as a memory for Y conversion.

In the image processing method on the image processing apparatus of the aspect of the present invention described above with reference to FIG. 3, analog density values obtained from the sensor 1 are converted into digital density values of the predetermined number of bits for the predetermined conversion density range by the analog to digital conversion means 2, and the digital density values thus obtained are compared with the predetermined threshold level for the individual picture elements so that they are each converted into one of two binary values of white and black. In this instance, a histogram of the density values of the noticed picture element and the adjacent picture elements around the noticed picture element is produced by the histogram production means 10 based on the output of the analog to digital conversion means 2.

Then, the setting means 12 sets a conversion density range for the noticed picture element in accordance with the density range of a peak appearing in the histogram produced by the histogram production means 10. In particular, when the density range of a peak appearing in the histogram is on the high density side (when image data of black are being read), the setting means 12 sets a conversion density range equal to the predetermined conversion density range of the analog to digital conversion means 2, but when the density range of a peak appearing in the histogram is on the low density side (when image data of a color such as red or blue are being read), the setting means 12 sets a conversion density range narrower than the predetermined conversion density range and ranging from the density level of the ground color to the low density level at which the peak appears.

Thereafter, the change-over means 13 converts the digital density value of the noticed picture element from the analog to digital conversion means 2 into a digital density value using the scale obtained by dividing the conversion density range by the number provided by the number of bits by which the analog to digital conversion means 2 performs analog to digital conversion. In particular, when image data of a high density are being read, the output of the analog to digital conversion means 2 is outputted as it is from the change-over means 13, but when image data of a low density are being read, the output of the analog to digital conversion means 2 is converted into a digital density value by the change-over means 13 using the scale obtained by dividing the narrow conversion density range by the same predetermined number of bits as in the case of a high density. The digital density value obtained by such conversion is outputted from the change-over means 13.

Figure 4:
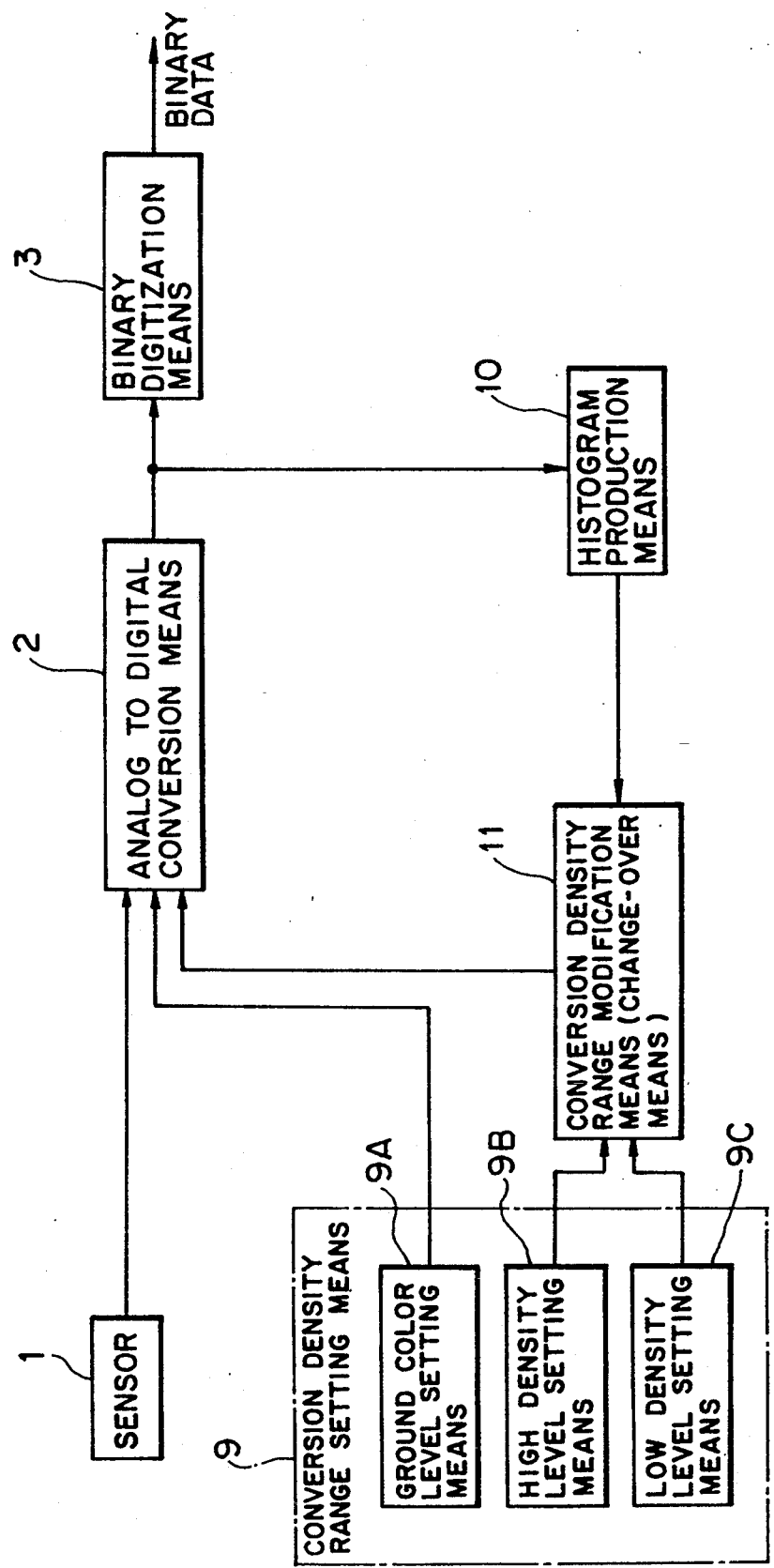
FIG. 4 is a similar view but illustrating a still further aspect of the present invention.

Referring now to FIG. 4, there is shown an image processing apparatus according to a still further aspect of the present invention. The image processing apparatus includes a sensor 1, analog to digital conversion means 2, binary digitization means 3, and histogram production means 10 which are all similar to those of the image processing apparatus described hereinabove with reference to FIG. 3. The image processing apparatus further includes conversion density range setting means 9 for setting a predetermined conversion density range for the analog to digital conversion means 2, and conversion density range modification means 11 for modifying the predetermined conversion density range set by the conversion density range setting means 9 in accordance with the density range of a peak appearing in the histogram produced by the histogram production means 10.

The conversion density range setting means 9 may include ground color level setting means 9A for setting an analog density value corresponding to the ground color of image data detected by the sensor 1 as a ground color reference level, high density level setting means 9B for setting an analog density value corresponding to high density side image data detected by the sensor 1 as a high density level reference value, and low density level setting means 9C for setting an analog density value corresponding to low density side image data detected by the sensor 1 as a low density level reference value.

The conversion density range modification means 11 may be constructed as change-over means for selectively outputting one of the high density level reference value from the high density level setting means 9B and the low density level reference value from the low density level setting means 9C to the analog to digital conversion means 2 in response to the density range of a peak appearing in the histogram produced by the histogram production means 10.

Thus, the predetermined conversion density range for the analog to digital conversion means 2 is set based on the ground color level reference value from the ground color level setting means 9A and one of the high density level reference value from the high density level setting means 9B and the low density level reference value from the low density level setting means 9C which has been selected by the change-over means 11.

In the image processing method on the image processing apparatus of the present invention described above with reference to FIG. 4, analog density values obtained from the sensor 1 are converted into digital density values of the predetermined number of bits for the predetermined conversion density range by the analog to digital conversion means 2, and the digital density values thus obtained are compared with the predetermined threshold level for the individual picture elements so that they are each converted into one of two binary values of white and black. Then, a histogram of the density values of the noticed picture element and the adjacent picture elements around the noticed picture element is produced by the histogram production means 10 based on the output of the analog to digital conversion means 2.

It is to be noted that the predetermined conversion density range for the analog to digital conversion means 2 is set by the conversion density range setting means 9. Normally, when image data of black appearing on paper whose ground color is white are read, the ground color level reference value from the ground color level setting means 9A and the high density level reference value from the high density level setting means 9B are inputted to the analog to digital conversion means 2, and the range between the ground color level reference value and the high density level reference value is set as the predetermined conversion density range. Consequently, digital density values are calculated from the density values from the sensor 1 using a scale obtained by dividing the predetermined conversion density range by a number provided by the predetermined number of bits and are outputted from the analog to digital conversion means 2.

Then, the conversion density range modification means 11 selectively changes over the reference value to be outputted to the analog to digital conversion means 2 between the high density level reference value from the high density level setting means 9B and the low density level reference value from the low density level setting means 9C in accordance with the density range of a peak appearing in the histogram produced by the histogram production means 10.

In particular, when the density range of a peak appearing in the histogram is on the high density side (when image data of black are being read), the high density level reference value from the high density level setting means 9B is outputted to the analog to digital conversion means 2 as in an ordinary case, but when the density range of a peak appearing in the histogram is on the low density side (when image data of red or blue are being read), the high density level reference value from the high density level setting means 9B is outputted to the analog to digital conversion means 2.

Consequently, when image data of a low density are being read, the ground color level reference value from the ground color level setting means 9A and the low density level reference value from the low density level setting means 9C are inputted to the analog to digital conversion means 2, and the range between the ground color level reference value and the low density level reference value is set as the predetermined conversion density range. Then, digital density values obtained using the scale obtained by dividing the predetermined conversion density range by the number provided by the same predetermined number of bits as that in the case of a high density are outputted to the analog to digital conversion means 2.

In this manner, with the image processing methods and the image processing apparatus of the aspects of the present invention described above, since, when the density value of a noticed picture element is lower than the predetermined threshold level, a binary value error of a picture element on the opposite side to the noticed picture element in the main scanning direction or the sub scanning direction is added to the density value of the noticed picture element and a sum value obtained by such addition is compared with the predetermined threshold level to effect determination between two binary values of white and black in order to restore the density value of a thin line which have been divided into two picture elements, a possible drop or break of a thin line which is caused by a little inclination of an original can be prevented with certainty by a simple processing procedure without emphasizing noise.

Further, with the image processing methods and the image processing apparatus of the aspects of the present invention described above, since the density conversion range for the analog to digital conversion means 2 is suitably modified in accordance with the density range of a peak in the histogram obtained by the histogram production means 10, even when image data of a document image or a like image in which two or more colors are used are read as a binary image of white and black (particularly when color characters are present discretely in a document), sharp binary digitization processing which does not cause blurring or distortion can be achieved advantageously.

b. First Embodiment

Figure 5:
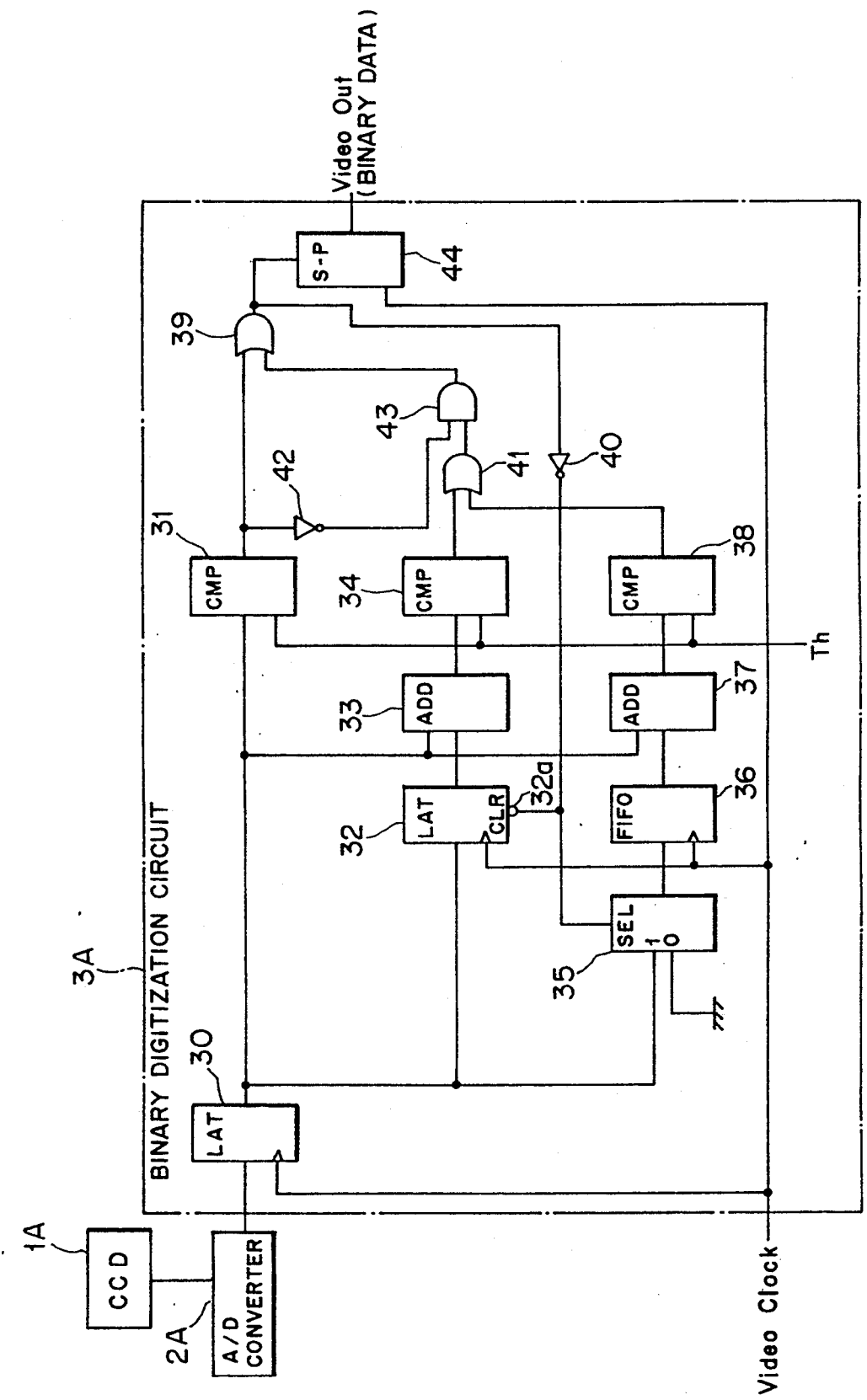
FIG. 5 is a block diagram of an apparatus to which an aspect of the image processing method of the present invention is applied showing a first preferred embodiment of the present invention.

FIG. 5 shows an image processing apparatus to which an image processing method according to the present invention is applied. Referring to FIG. 5, the image processing apparatus shown includes a CCD element (sensor) 1A for scanning an original not shown in a main scanning direction and a sub scanning direction to detect density values for individual picture elements of image data, an analog to digital converter 2A for converting the analog density values obtained from the CCD element 1A into digital density values of a predetermined number of bits for a predetermined conversion density range, and a binary digitization circuit 3A serving as binary digitization means for comparing the digital density values from the analog to digital converter 2A for the individual picture elements with a predetermined threshold level to convert them each into one of two binary values of white and black.

The binary digitization circuit 3A includes a pair of latch circuits (LAT) 30 and 32, three comparators (CMP) 31, 34 and 38, a pair of adders (ADD) 33 and 37, a selector (SEL) 35, a FIFO (First-In First-Out) memory 36, a pair of logical OR gates 39 and 41, a pair of NOT (invertor) gates 40 and 42, a logical AND gate 43, and a serial to parallel converter (S-P) 44.

Figure 6:
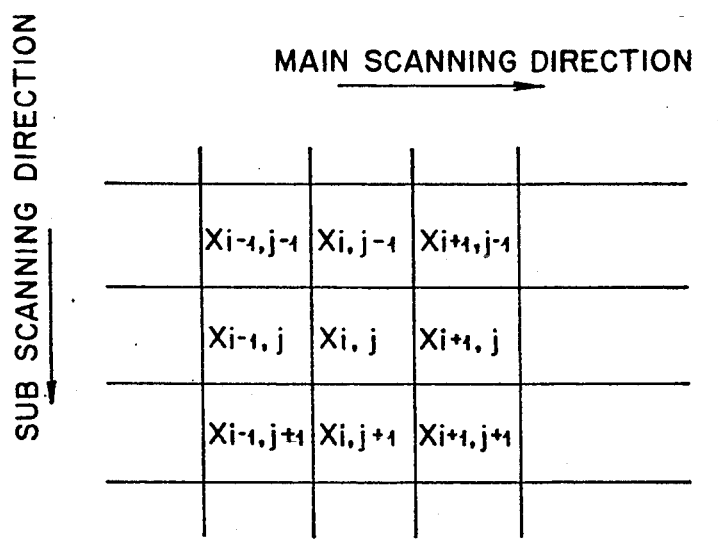
FIG. 6 is a diagrammatic view illustrating density values of a noticed picture element and picture elements around the noticed picture element in the image processing method of the first embodiment of the present invention.

The latch circuit 30 latches a video input (digital density values including a digital density value xi, j of a noticed picture element, refer to FIG. 6) inputted thereto from the analog to digital converter 2A in synchronism with a video clock signal.

The comparator 31 serves as first comparison means and compares the digital density value xi, j of the noticed picture element latched by the latch circuit 30 with a predetermined threshold level Th. Then, the comparator 31 outputs a black signal (H (high) level signal) when the digital density value xi, j is equal to or higher than the predetermined threshold level Th, but outputs a white signal (L (Low) level signal) when the digital density value xi, j is lower than the predetermined threshold level Th.

The latch circuit 32 serves as first storage means and latches a digital density value from the latch circuit 30 to store a binary value error ei−1, j of a picture element on the opposite side to the noticed picture element in the main scanning direction.

Here, the binary value error ei−1, j is set, when the binary digitization output of the last noticed picture element is a black signal (H level signal), to zero since a clear signal (It level signal) is inputted to a clear terminal (CLR) of the latch circuit 32 by way of an inversion element 32a through the OR gate 39 and the NOT gate 40 so that the data (digital density value xi−1, j of the last noticed picture element) of the latch circuit 32. On the other hand, when the binary digitization output of the last noticed picture element is a white signal (L level signal), the latch circuit 32 is not cleared and the binary value error ei−1, j is set to the digital density value xi−1, j of the last noticed picture element (that is, the digital density value of the picture element on the opposite side to the present noticed picture element in the main scanning direction, refer to FIG. 6).

The adder 33 serves as first addition means and adds the binary value error ei−1, j stored in the latch circuit 32 to the digital density value xi, j of the noticed picture element. Then, the adder 33 outputs a sum value obtained by such addition as a first sum value.

The comparator 34 serves as second comparison means and compares the result of addition (first sum value) of the adder 33 with the predetermined threshold level Th. Then, the comparator 34 outputs a black signal (H level signal) when the first sum value is equal to or higher than the predetermined threshold level Th, but outputs a white signal (L level signal) when the first sum value is lower than the predetermined threshold level Th.

The selector 35 outputs, when the binary digitization output of the present noticed picture element is a black signal (H level signal), "0" as a binary value error ei, j of the present noticed picture element to the FIFO memory 36 at the next stage since an L level signal is inputted to a change-over terminal (SEL) of the selector 35 by way of the OR gate 39 and the NOT gate 40, but outputs, when the binary digitization output of the present noticed picture element is a white signal (L level signal), the digital density value xi, j of the present noticed picture element latched in the latch circuit 30 as a binary value error ei, j of the present noticed picture element to the FIFO memory 36 at the next stage since an H level signal is inputted to the change-over terminal of the selector 35 by way of the OR gate 39 and the NOT gate 40.

The FIFO memory 36 serves as second storage means and stores the binary value error ei, j of the present noticed picture element from the selector 35 and outputs a binary value error ei, j−1 of a picture element in the last row delayed by a time for one main scanning period from the present noticed picture element (that is, the picture element on the opposite side to the noticed picture element in the sub scanning direction) in synchronism with the video clock signal.

The binary value error ei, j−1 is set to "0" by the function of the selector 35 described above when the binary digitization output of the noticed picture element in the last row delayed by a time for one main scanning period is a black signal (H level signal), but is set to the digital density value xi, j−1 of the noticed picture element in the last row delayed by a time for one main scanning period, that is, the digital density value of the picture element on the opposite side to the noticed picture element in the sub scanning direction (refer to FIG. 6), when the binary digitization output of the noticed picture element in the last row delayed by the time for one main scanning period is a white signal (L level signal).

The adder 37 serves as second addition means and adds the binary value error ei, j−1 outputted from the FIFO memory 36 to the digital density value xi, j of the noticed picture element. The adder 37 then outputs a value obtained by such addition as a second sum value.

The comparator 38 serves as third comparison means and compares the result of addition (second sum value) of the adder 37 with the predetermined threshold level Th. Then, the comparator 38 outputs a black signal (H level signal) when the second sum value is equal to or higher than the predetermined threshold level Th, but outputs a white signal (L level signal) when the second sum value is lower than the predetermined threshold level Th.

The OR gate 39 outputs the result of logical ORing between the output of the comparator 31 and the output of the AND gate 43 (which is the result of logical ORing by the OR gate 41 between the outputs of the comparator 34 and the comparator 38) as a result of binary digitization processing of the binary digitization circuit 3A.

The NOT gate 40 inverts the output of the OR gate 39, which is the result of binary digitization processing for the present noticed picture element, and outputs a resulted signal to the inversion element 32a (clear terminal CLR) of the latch circuit 32 and the change-over terminal (SEL) of the selector 35 as described above.

The OR gate 41 outputs the result of logical ORing between the output of the comparator 34 and the output of the comparator 38, and the NOT gate 42 inverts the output of the comparator 31 and outputs a resulted signal.

The AND gate 43 outputs the result of logical ANDing between the output of the NOT gate 42 and the output of the OR gate 41 so that the result of logical ORing from the OR gate 41 is outputted to the OR gate 39 only when the output of the NOT gate 42 is an H level signal, that is, when it is determined by the comparator 31 that the digital density value xi, j of the noticed picture element is lower than the predetermined threshold level Th.

The serial to parallel converter 44 converts the result of binary digitization processing (a binary signal of white or black) in the form of a serial signal from the OR gate 39 into a parallel signal of a suitable length, for example, 8 bits=1 byte and outputs the parallel signal.

In the following, operation of the binary digitization circuit 3A constructed in such a manner as described above will be described with reference to processing steps S1 to S9 of FIG. 7. It is to be noted that, while processing based on the result of comparison by the comparator 34 and processing based on the result of comparison by the comparator 38 are performed successively in order, in the apparatus of the construction shown in FIG. 5, such processes are performed parallelly as they are performed by separate hardware constructions.

Figure 7:
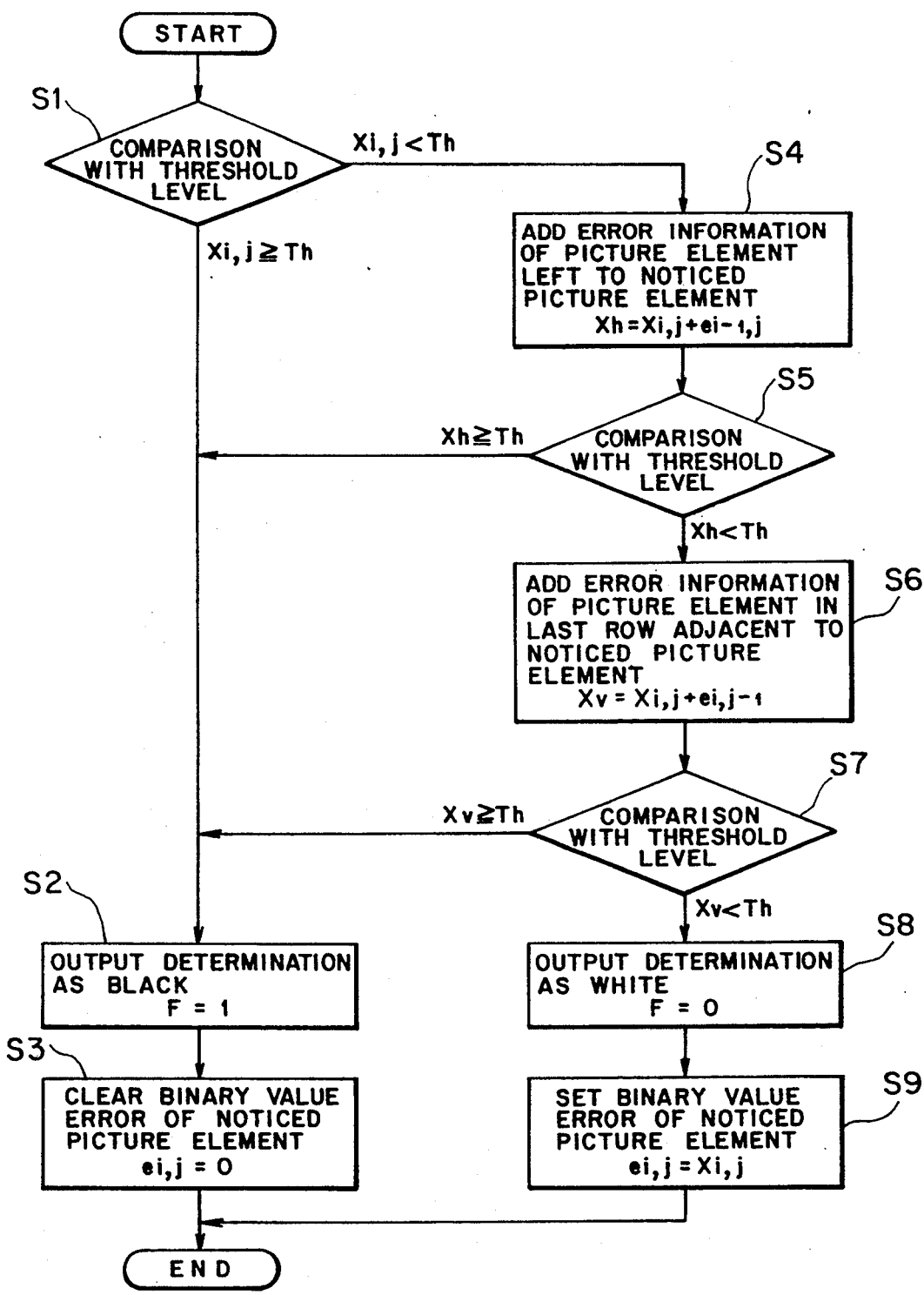
FIG. 7 is a flow chart illustrating the image processing method of the first embodiment of the present invention.

Referring to FIG. 7, image data (digital density values) detected by the CCD element 1A and converted into digital values by the analog to digital converter 2A are inputted to and latched by the latch circuit 30 in synchronism with the video clock signal so that they are synchronized with the video clock signal.

A digital density value xi, j of a noticed picture element inputted to the latch circuit 30 is compared with the predetermined threshold level Th by the comparator 31 (step S1), and then when it is determined that the digital density value xi, j of the noticed picture element is equal to or higher than the predetermined threshold level Th, a black signal (H level signal; an output flag F=1) is outputted as a result of binary digitization processing from the comparator 31 and introduced to the serial to parallel converter 44 by way of the OR gate 39 (step S2).

After the black signal (H level signal) is outputted as a result of binary digitization processing from the OR gate 39, a clear signal (H level signal) is inputted to the clear terminal of the latch circuit 32 by way of the inversion element 32a via the OR gate 39 and the NOT gate 40, and the digital density value xi, j of the present noticed picture element is not latched by the latch circuit 32, but "0" is latched and set as a binary value error ei, j of the present noticed picture element by the latch circuit 32 (step S3). At the same time, an L level signal is inputted to the change-over terminal of the selector 35 by way of the OR gate 39 and the NOT gate 40, and consequently, "0" is outputted as the binary value error ei, j of the present noticed picture element from the selector 35 to the FIFO memory 36 at the next stage (step S3).

On the other hand, if it is determined by the comparator 31 that the digital density value xi, j of the noticed picture element is equal to or higher than the predetermined threshold level Th, a white signal (L level signal) is outputted from the comparator 31. Since the L level signal is inverted by the NOT gate 42 and inputted as an H level signal to the AND gate 43, it is enabled to output the result of logical ORing of the OR gate 41 as a result of binary digitization processing from the AND gate 43.

Then, the adder 33 adds a binary value error ei−1, j, that is, a binary value error of a picture element on the left side of the noticed picture element in FIG. 6, stored in the latch circuit 32 to the digital density value xi, j of the noticed picture element (step S4), and then the adder 37 adds another binary value error ei, j−1 outputted from the FIFO memory 36, that is, a binary value error of a picture element in the last row to the noticed picture element in FIG. 6, to the digital density value xi, j of the noticed picture element (step S6). Sum values obtained by such addition are outputted as a first sum value xh and a second sum value xv.

The sum values xh and xv by the adder 33 and the adder 37 are compared with the predetermined threshold level Th by the comparator 34 and the comparator 38 (steps S5 and S7), respectively, and if it is determined by either one of the comparator 34 and the comparator 38 that the sum value xh or xv is equal to or higher than the predetermined threshold level Th, a black signal (H level signal; the output flag F=1) is outputted from a corresponding one of the comparator 34 and the comparator 38. The black signal is introduced as a result of binary digitization processing to the serial to parallel converter 44 by way of the OR gate 41, the AND gate 43 and the OR gate 39 (step S2).

Simultaneously, "0" is latched and set as a binary value error ei, j of the present noticed picture element by the latch circuit 32, and an L level signal is inputted to the change-over terminal of the selector 35 by way of the OR gate 39 and the NOT gate 40. Consequently, "0" is outputted as the binary value error ei, j of the present noticed picture element to the FIFO memory 36 at the next stage.

On the other hand, if it is determined as a result of comparison between the sum values xh and xv from the adder 33 and the adder 37 and the predetermined threshold level Th by the comparator 34 and the comparator 38, respectively, that both of the sum values xh and xv are lower than the predetermined threshold level Th, a white signal (L level signal) is outputted from both of the comparator 34 and the comparator 38. Consequently, both of the OR gate 41 and the AND gate 43 output an L level signal, and accordingly, also the result of binary digitization processing outputted from the OR gate 39 becomes a white signal (L level signal; the output flag F=0). The white signal is introduced to the serial to parallel converter 44 (step S8).

When the white signal (L level signal) is outputted as a result of binary digitization processing from the OR gate 39, the signal to be sent to the clear terminal of the latch circuit 32 by way of the NOT gate 40 becomes an L level signal, and consequently, the digital density value xi, j of the present noticed picture element is latched and set as the binary value error ei, j of the noticed picture element of the present cycle by the latch circuit 32 (step S9). At the same time, an H level signal is inputted to the change-over terminal selector 35 by way of the NOT gate 40, and consequently, the digital density value xi, j of the present noticed picture element is outputted as the binary value error ei, j of the noticed picture element of the present cycle to the FIFO memory 36 at the next stage (step S9).

In this manner, according to the first embodiment of the present invention, a density value xi, j of a noticed picture element is first compared with the threshold level Th, and if the density value xi, j is equal to or higher than the threshold level Th, it is determined that the notice picture element is black and the binary value error ei, j of the noticed picture element is set to "0".

On the other hand, if the density value xi, j of the noticed picture element is lower than the threshold level Th, a first sum value xh obtained by addition of a binary value error ei−1, j of a picture element on the left side of the noticed picture element in FIG. 6 to the density value xi, j and a second sum value xv obtained by addition of another binary value error ei, j−1 of another picture element in the last row to the noticed picture element in FIG. 6 to the density value xi, j are individually compared with the threshold level Th, and if either one of the first and second sum values xh and xv is equal to or higher than the threshold level Th, then it is determined that the noticed picture element is black and simultaneously the binary value error ei, j of the noticed picture element is set to "0"

On the other hand, when both of the first sum value xh and the second sum value xv are lower than the threshold level Th, it is determined that the noticed picture element is white and simultaneously the density value xi, j is set as the binary value error ei, j of the noticed picture element.

Figure 8:
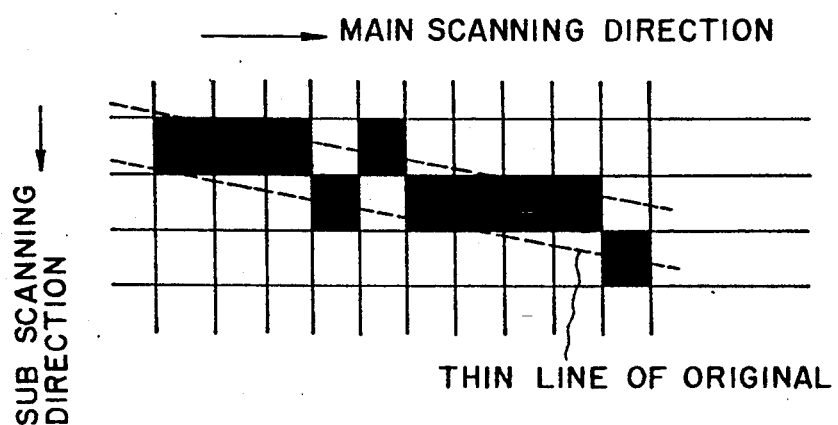
FIG. 8 is a diagrammatic view illustrating an example of correction for a drop of a thin line by the image processing method of the first embodiment of the present invention.

Due to such processing as described above, even if it is determined that either one of two picture elements spanned by a thin line as shown in FIG. 8 is white, since the density value based on which the determination of white has been made is added or distributed to one of two downward and rightward adjacent picture elements as a binary value error, a drop or break of the thin line which may be caused by a little inclination of the original can be prevented with certainty by a simple processing procedure without emphasizing noise.

Meanwhile, when it is intended to achieve the image processing method with hardware construction, the hardware construction can be realized without a delay with a smaller amount of circuitry than that of a conventional construction which is achieved by binary digitization processing. Accordingly, the present invention contributes very much to enhancement of the functions of an image processing apparatus.

It is to be noted that, while, in the embodiment described above, both of binary value errors of a picture element on the opposite side to a noticed picture element in the main scanning direction and another picture element on the opposite side to the noticed picture element in the sub scanning direction are added to a density value of the noticed picture element, only one of the binary value errors of the picture element on the opposite side of the noticed picture element in the main scanning direction and the picture element on the opposite side of the noticed picture element in the sub scanning direction may be added to the density value of the noticed picture element. Also in this instance, similar advantages to those of the embodiment described above can be achieved.

Further, while, in the embodiment described above, the comparator 31, the comparator 34 and the comparator 38 have the same predetermined threshold level Th, particularly the threshold level for the comparator 34 and the threshold level for the comparator 38 may be set different from each other. The first sum value obtained by addition of the error information of the picture element on the opposite side (on the left side) to the noticed picture element in the main scanning direction to the density value of the noticed picture element is comparatively liable to become so high that it exceeds the threshold level, and accordingly, it is desirable that, taking such liability into consideration, the threshold level for the comparator 34 be set higher than the threshold level for the comparator 38.

c. Second Embodiment

Figure 9:
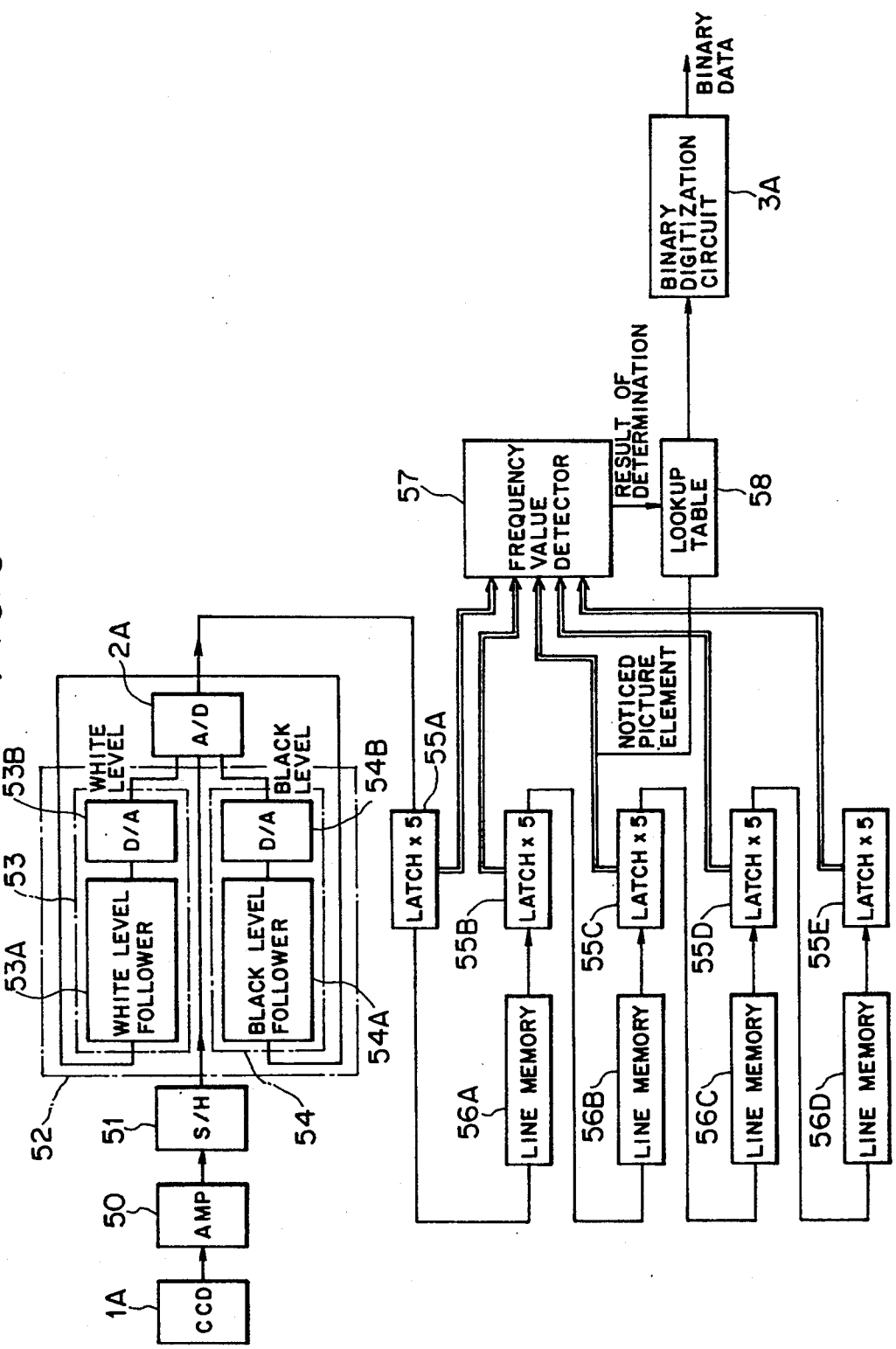
FIG. 9 is a block diagram of another apparatus to which another aspect of the image processing method of the present invention is applied showing a second preferred embodiment of the present invention.

FIG. 9 shows an image processing apparatus to which another image processing method according to the present invention is applied. In the present embodiment, a two-color original whose ground color is white and on which data such as characters are written in black and red is read.

Referring to FIG. 9, the image processing apparatus shown includes a CCD element 1A serving as a sensor, an analog to digital converter 2A serving as analog to digital conversion means, and a binary digitization circuit 3A serving as binary digitization means. The CCD element 1A scans an original not shown in a main scanning direction and a sub scanning direction to detect density values for individual picture elements of image data from light reflected from the image data. The analog to digital converter 2A receives the analog density values obtained from the CCD element 1A by way of an amplifier 50 and a sample hold circuit 51 and converts the analog density values into digital density values of a predetermined number of bits for a predetermined conversion density range. The binary digitization circuit 3A compares the digital density values received from the analog to digital converter 2A by way of a lookup table 58 and some other circuit, which will be hereinafter described, for the individual picture elements with a predetermined threshold level to convert the digital density values each into one of two binary values of white and black.

The image processing apparatus further includes a conversion density range setting section 52 for setting a predetermined conversion density range for the analog to digital converter 2A. The conversion density range setting section 52 includes a white level setting section 53 serving as ground color level setting means for setting an analog density value (minimum reference voltage value) corresponding to the white (ground color of an original which is an object for reading of an image) of image data detected by the CCD element 1A as a white level reference value (white reference), and a black level setting section 54 serving as high density level setting means for setting an analog density value (maximum reference voltage value) corresponding to high density side image data (in the present embodiment, a black character) detected by the CCD element 1A as a black level reference value (black reference).

The white level setting section 53 includes a white level follower 53A for following the white, which is the ground color of an actual original, in accordance with digital density values obtained by the CCD element 1A and the analog to digital converter 2A to correct the white level reference value, and a digital to analog converter 53B for converting the digital output of the white level follower 53A into an analog value (voltage value) and outputting the analog value to the analog to digital converter 2A. Similarly, the black level setting section 54 includes a black level follower 54A for following the black of black characters on an actual original in accordance with digital density values obtained from the CCD element 1A and the analog to digital converter 2A to correct the black level reference value, and a digital to analog converter 54B for converting the digital output of the black level follower 54A into an analog value (voltage value) and outputting the analog value to the analog to digital converter 2A.

It is to be noted that a section including the CCD element 1A, the amplifier 50, the sample hold circuit 51, the analog to digital converter 2A, and the conversion density range setting section 52 described above is similar to a quantizer which is employed in popular image scanners while a conversion maximum value level and a conversion minimum value level of the analog to digital converter 2A are determined by the white level setting section 53 and the black level setting section 54 described above, respectively, and quantization (digital conversion) with a predetermined number of bits (8 bits in the present embodiment) is performed by the analog to digital converter 2A for a conversion density range defined by those levels. In the present embodiment, conversely to the first embodiment described hereinabove, the output of the analog to digital converter 2A exhibits the value 0 when the density value is equal to the reference value of black, but exhibits the value 255 when the density value is equal to the reference value of white as hereinafter described with reference to FIGS. 11 to 13.

The image processing apparatus further includes five latch circuits 55A to 55E each capable of successively latching five 8-bit data (data for 5 bytes, which are digital density values for individual picture elements), and four line memories 56A to 56D for successively delaying and sending out five 8-bit data to the latch circuits 55B to 55E, respectively. A matrix of 5×5 digital density values centered at a noticed picture element is formed by the latch circuits 55A to 55E and the line memories 56A to 56D. It is to be noted that, while the four line memories 56A to 56D have a memory capacity for one main scanning minus 5 bytes, such data for 5 bytes are compensated for by the latch circuit 55A.

The image processing apparatus further includes a frequency value detector 57 serving as histogram production means for producing a histogram of density values of a noticed picture element and picture elements around the noticed picture element using the factors of the matrix of the digital density values latched in the latch circuits 55A to 55E. Detailed construction of the frequency value detector 57 will be hereinafter described with reference to FIG. 10.

The image processing apparatus further includes a lookup table 58 serving as setting means and conversion means. In particular, the lookup table 58 functions as setting means for setting a conversion density range for a noticed picture element in accordance with the density range of a peak appearing in the histogram produced by the frequency value detector 57 (that is, density values of a first peak and a second peak which will be hereinafter described with reference to FIGS. 12 and 13). Further, the lookup table 58 converts the digital density value of the noticed picture element from the analog to digital converter 2A (in the present embodiment, data latched at the center of the latch circuit 55C) into another digital density value using a scale obtained by dividing the conversion density range set by the function of the lookup table 58 as the setting means by a number provided by the equal bit number (8 bits in the present embodiment) to the conversion bit number by the analog to digital converter 2A. It is to be noted that, in the present embodiment, the lookup table 58 is constituted from a memory which is normally used as a memory for Y conversion.

Figure 10:
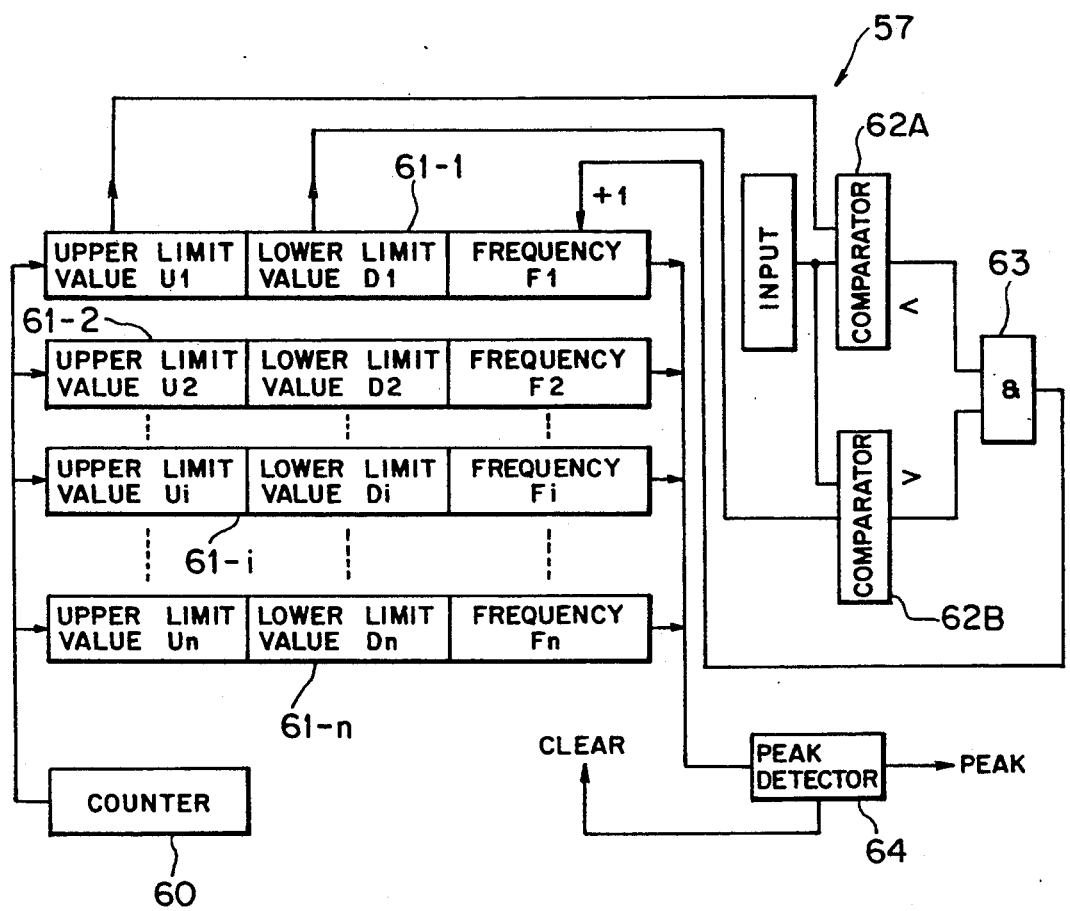
FIG. 10 is a block diagram showing a detailed construction of a frequency value detector (histogram production means) of the image processing apparatus shown in FIG. 9.

Referring now to FIG. 10, the frequency value detector 57 includes a counter 60, n registers 61-1 to 61-n, a pair of comparators 62A and 62B, an AND gate 63, and a peak detection section 64.

The registers 61-1 to 61-n are provided for divisional ranges obtained by dividing a predetermined conversion density range of the analog to digital converter 2A by n and store upper limit values Ui (i=1 to n) and lower limit values Di (i=1 to n) of the divisional ranges and frequencies Fi (i=1 to n) of density values which belong to the individual divisional ranges.

The comparators 62A and 62B compare the upper limit value Ui and the lower limit value Di read out from one of the registers 61-1 to 61-n in response to a count signal of the counter 60 each time a factor of a matrix of 5×5 digital density values is inputted with the inputted density value, respectively. The comparator 62A outputs a high level when the input density value is equal to or lower than the upper limit value Ui, and the comparator 62B outputs a high level when the input density value is equal to or higher than the lower limit value Di.

The AND gate 63 outputs the result of logical ANDing between the outputs of the comparators 62A and 62B. In particular, when both of the outputs of the comparators 62A and 62B exhibit a high level, that is, when a divisional range to which the input density value belongs is determined, the AND gate 63 outputs a high level and increments one of the frequencies F1 to Fn of the registers 61-1 to 61-n for the divisional region by one. For example, when it is determined by the comparators 62A and 62B that the input density value is equal to or lower than the upper limit value Ui and equal to or higher than the lower limit value Di, the output of the AND gate 63 exhibits a high level and the frequency Fi of the register 61-i is incremented by one.

The peak detection section 64 detects, after determination to which one of the divisional ranges the input density value belongs is completed for all of the factors of a matrix of 5×5 digital density values, a register number of one of the frequencies F1 to Fn stored in the registers 61-1 to 61-n which makes a peak, and outputs the register number, that is, the density range of the peak appearing in the histogram. Here, the peak detection section 64 in the present embodiment detects and outputs both of a density range of a first peak (density range of the ground color) and another density range of a second peak (density range of black or red).

Before operation of the image processing apparatus of the second embodiment having such a construction as described above is described, a factor of occurrence of blurring or distortion upon reading of a two-color original and the principle in reading a two-color original sharply with the image processing apparatus of the present embodiment will be described with reference to FIGS. 11 to 13.

Figure 11:
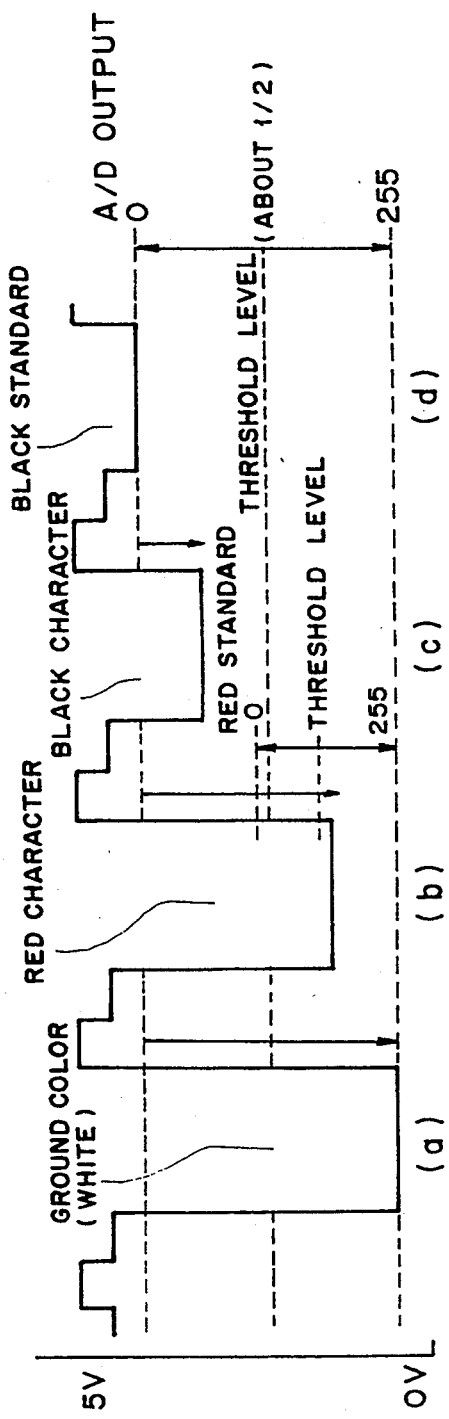
FIG. 11 is a graph illustrating a popular CCD output when the ground color, red characters and black characters are read.

FIG. 11 is a graph showing a general CCD output when a ground color, a red character and a black character are read. When no incident light is inputted to the CCD element 1A at all, the CCD output voltage value is, for example, 5 V, and when light is inputted to the CCD element 1A, the CCD output voltage value falls from 5 V. Then, when white which is the ground color of the original is read in as indicated at a portion (a) in FIG. 11, the CCD output voltage value exhibits a minimum value. The voltage value then is followed and held as a minimum reference voltage value by the white level setting section 53 to set a white reference.

On the other hand, the CCD output voltage value when black is read in becomes almost close to 5 V which is the maximum voltage value as seen from a portion (d) of FIG. 11, and the maximum voltage value is followed and held as a maximum reference voltage value by the black level setting section 54 to set a black reference.

Since an actual analog to digital conversion input signal is inverted, where an analog to digital converter of 8 bits is used for the analog to digital converter 2A, when the output of the analog to digital converter 2A is 0, the color read is black, but when the output is 255, the color read is white. Processing based on the output of the analog to digital converter 2A of such construction will be described below.

When a black character is read in actually, the output of the analog to digital converter 2A does not exhibit the full value of 0 as seen from a portion (c) in FIG. 11, but exhibits a considerably low level. Accordingly, if the threshold level for the binary digitization circuit 3A is normally set to 128, then the output of the analog to digital converter 2A for a black character exhibits a level lower than the threshold level and accordingly is determined as black.

However, if a red character is read in, the output of the analog to digital converter 2A exhibits little drop as seen from another portion (b) in FIG. 11 and has a level close to the threshold level for the binary digitization circuit 3A. Consequently, the result of binary digitization processing by the binary digitization circuit 3A exhibits frequent reversal between white and black, resulting in occurrence of blurring. Although a possible measure to cope with such blurring is to set the threshold level for the binary digitization circuit 3A comparatively low, if the threshold level is low, now a black character will be read in in a distorted condition. The cause of occurrence of such blurring of a red character or distortion of a black character resides in the fact that the black reference which is used upon reading of a black character is used commonly for reading of a red character.

Therefore, in the present invention, the density conversion range for digital density values by the analog to digital converter 2A is changed over depending upon whether a black character is read or a red character is read so that sharp image reading which does not cause blurring of a red character or distortion of a black character can be achieved while a common threshold level is used for both of a black character and a read character by the binary digitization circuit 3A.

Figure 12:
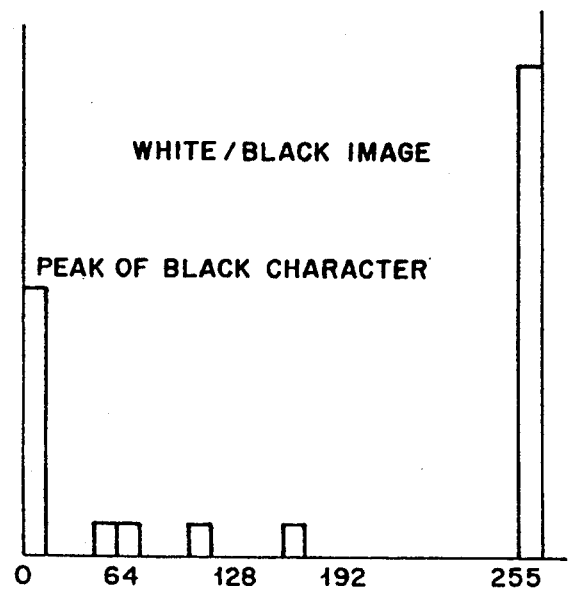
FIG. 12 is a graph showing an example of a histogram of density values when black characters are read using white and black references.
Figure 13:
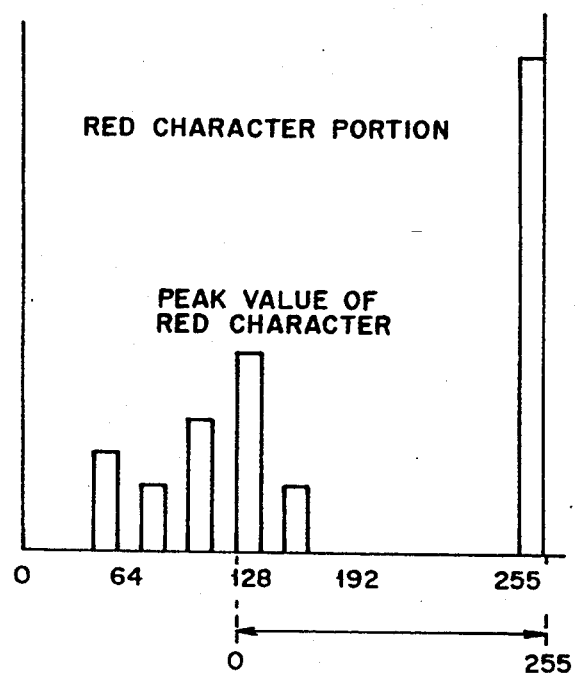
FIG. 13 is a graph showing another example of a histogram of density values when red characters are read using the white and black references.

FIGS. 12 and 13 are graphs showing examples of a histogram of density values when a black character and a red character are read using white and black references. When a black character appearing on an original having a white ground color is read, the histogram produced in the frequency value detector 57 is such as shown in FIG. 12 wherein a first peak appears at a portion corresponding to a density range of white and a second peak (peak of a black character) appears at another portion corresponding to another density range of black. In contrast, when a red character appearing on an original having a white ground color is red in, the histogram produced in the frequency value detector 57 is such as shown in FIG. 13 wherein a first peak appears at a portion corresponding to a density range of white and a second peak (peak of a red character) appears at another portion corresponding to a density range of red (in the proximity of the digital density value of 128 in FIG. 13).

In the present embodiment, a first peak and a second peak of a histogram from a matrix of 5×5 digital density values centered at a noticed picture element are found by the frequency value detector 57, and the conversion density range of the analog to digital converter 2A is changed to a suitable one depending upon whether the density range to which one of the first peak and the second peak belongs coincides with the density range of black or the density range of red.

In particular, when the density range to which one of the first peak and the second peak belongs is the black area, the output of the analog to digital converter 2A is used as it is. However, when the density range to which one of the first peak and the second peak belongs is the red area, the output of the analog to digital converter 2A is converted into a digital conversion value by means of the lookup table 58 by quantization using a scale obtained by dividing the range from the lower limit value of the density range of red to the upper limit value of the density range of white by a number provided by 8 bits.

In this manner, in the second embodiment of the present invention, when the density range of a peak of the histogram detected by the frequency value detector 57 is the black area (when black image data are being read), the digital density value from the analog to digital converter 2A is outputted as it is as a density value of the noticed picture element to the binary digitization circuit 3A.

In contrast, when the density range of the peak in the histogram detected by the frequency value detector 57 is a red area (when red image data are being read), a conversion density range corresponding to the density range of red described above and narrower than the ordinary conversion density range is set, and the digital density value of the noticed picture element from the analog to digital converter 2A is converted into another digital density value by quantization with 8 bits using the scale for the conversion density range for red by the lookup table 58. The digital conversion value obtained by such conversion is outputted to the binary digitization circuit 3A.

Accordingly, even when image data of a document image or the like on which two or more colors are used is read as a binary image of white and black, and particularly when color characters are present discretely on the document, sharp binary digitization processing which does not cause blurring or distortion can be achieved by modifying the conversion density range in response to the color of the image for an object of reading. Accordingly, the effect of the automatic binary digitization method can be anticipated also for colored characters.

Further, since a color scanner need not be used for a small number of color characters, particularly where a high speed operation and a high compression ratio are required in electronic filing or the like, an ordinary monochromatic scanner can be used. This contributes very much to reduction of the cost.

It is to be noted that, while, in the embodiment described above, the output of the analog to digital converter 2A is converted by means of the lookup table 58 when the density range of a peak corresponds to a red area, such conversion processing may alternatively be performed directly by calculation without using a lookup table. In this instance, the following equation (2) is used as a conversion equation:

$$Y = |X - R_{PEAK}| * [255/(255 - R_{PEAK})] \quad (2)$$

where Y is the digital density value after conversion, X is the digital density value outputted from the analog to digital converter 2A, and $R_{PEAK}$ is the digital density value when the red reference is converted by the analog to digital converter 2A.

Further, while, in the embodiment described above, it is described that a two-color original including a black character and a red character is read, where the original includes some other color than red, such as for example, blue image data, similar advantages to those of the embodiment described above can be achieved by setting a conversion density range conforming to the image data of blue and converting the output of the analog to digital converter 2A in accordance with the conversion density range using a lookup table or some other suitable means.

Furthermore, in the embodiment described above, it may be added as a requirement for determination of the density range of a peak as a red area by the frequency value detector 57 that a peak value (frequency value) which belongs to the density range of red exceeds a predetermined frequency.

d. Third Embodiment

Figure 14:
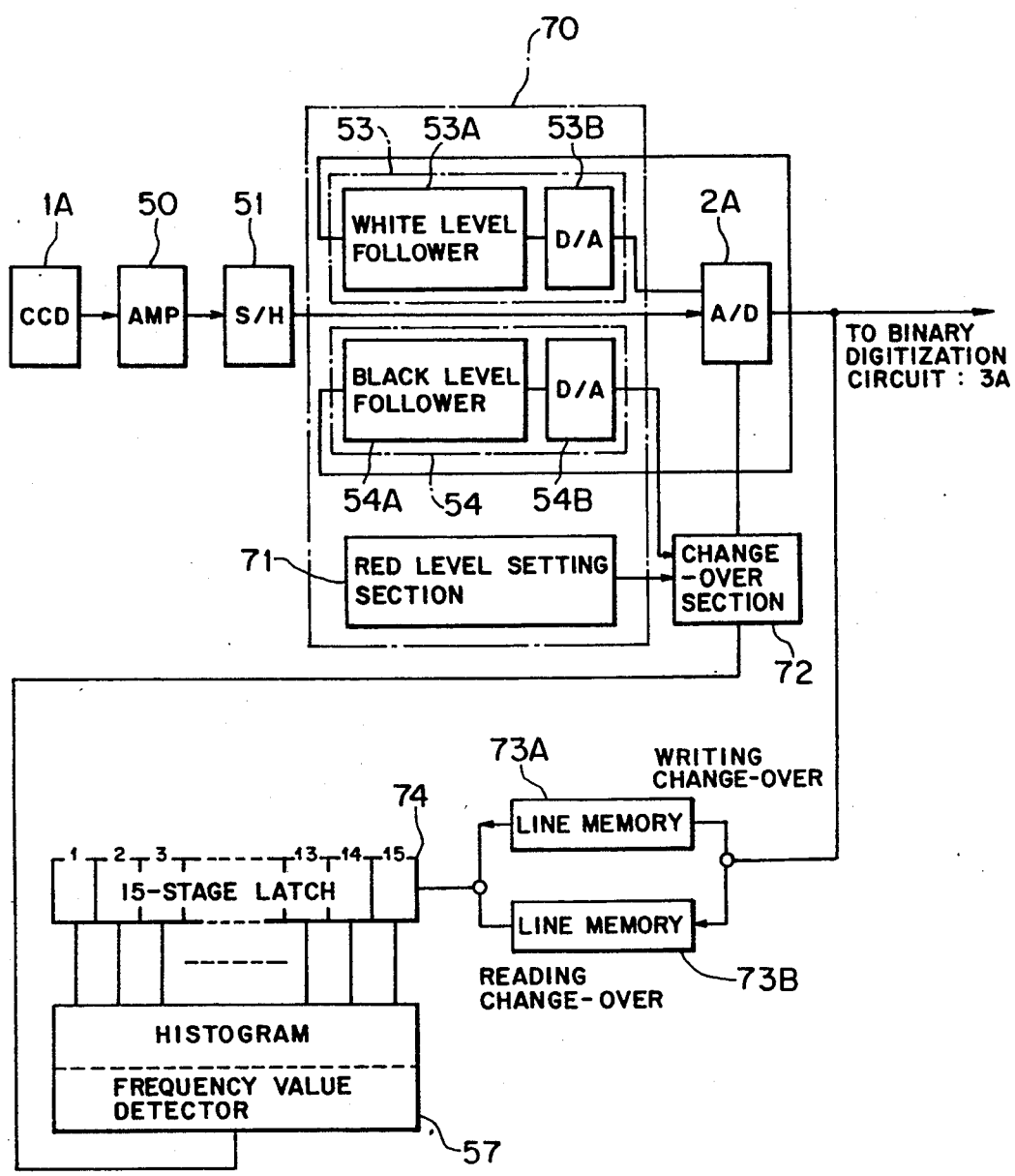
FIG. 14 is a block diagram of a further apparatus to which a further aspect of the image processing method of the present invention is applied showing a third preferred embodiment of the present invention.
Figure 15:
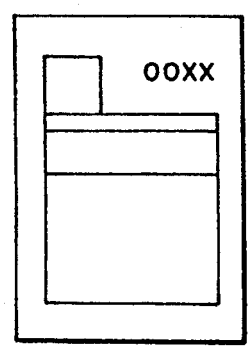
FIG. 15 is a diagrammatic view showing an example of an original which makes an object for reading of an image.
Figure 16:
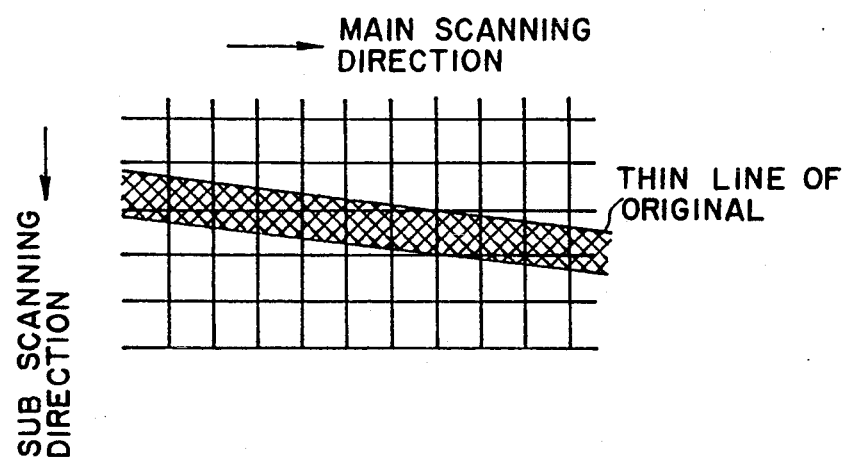
FIG. 16 is a diagrammatic view showing, in an enlarged scale, a thin line in an original which extends in an inclined condition with respect to a scanning direction of the original.

FIG. 14 shows an image processing apparatus to which a further image processing method according to the present invention is applied. Referring to FIG. 14, the image processing apparatus shown includes a CCD element (CCD) 1A, an amplifier (AMP) 50, a sample hold circuit (S/It) 51, an analog to digital converter (A/D) 2A and a frequency value detector 57 similar to those of the image processing apparatus described hereinabove with reference to FIG. 9. Further, though not shown, the image processing apparatus further includes a binary digitization circuit similar to the binary digitization circuit 3 shown in FIG. 9. Since the components mentioned above are similar to those of FIG. 9, overlapping description thereof is omitted herein to avoid redundancy.

The image processing apparatus further includes a density conversion range setting section 70 serving as density conversion range setting means for setting a predetermined conversion density range for the analog to digital converter 2A. The density conversion range setting section 70 includes a white level setting section 53 serving as ground color level setting means, a black level setting section 54 serving as high density level setting means, and a red level setting section 71 serving as low density level setting means. The white level setting section 53 and the black level setting section 54 are quite similar to those of the white level setting section 53 and the black level setting section 54 described hereinabove in connection with the second embodiment of the present invention with reference to FIG. 9, respectively, and overlapping description of them is omitted herein to avoid redundancy. The red level setting section 71 sets an analog density value (a density value corresponding to the red reference of FIG. 11 or 13) for low density side image data detected by the CCD element 1A as a red level reference value (red reference).

It is to be noted that also the red level setting section 71 may include, similarly to the white level setting section 53 or the black level setting section 54, a red level follower for following the red on an actual original from the analog to digital converter 2A to correct the red level reference value, and a digital to analog converter for converting a digital output of the red level follower into an analog value (voltage value) and outputting the analog value to the analog to digital converter 2A.

The image processing apparatus further includes a change-over section 72 serving as conversion density range modification means or change-over means for modifying the predetermined conversion density range set by the density conversion range setting section 70 in accordance with the density range of a peak appearing in a histogram produced by the frequency value detector 57. The change-over section 72 selects one of the black level reference value from the black level setting section 54 and the red level reference value from the red level setting section 71 in response to the density range of a peak appearing in the histogram produced by the frequency value detector 57 and outputs the selected reference value to the analog to digital converter 2A.

Consequently, the predetermined conversion density range for the analog to digital converter 2A is set in accordance with the white level reference value from the white level seating section 53 and one of the black level reference value from the black level setting section 54 and the red level reference value from the red level setting section 71 selected by the change-over section 72.

Further, in the analog to digital converter 2A of the present embodiment, digital conversion is performed twice for the period of one CCD clock: digital conversion for the first time is performed based on the black reference from the black level setting section 54, and digital conversion for the second time is performed based on the red reference from the red level setting section 71.

The image processing apparatus further includes a pair of line memories 73A and 73B for storing only the output of the analog to digital converter 2A when the black reference is selected. The line memory 73A and the line memory 73B perform writing/reading exclusively for each one scanning.

The image processing apparatus further includes a 15-stage latch circuit 74 for alternately latching data written in the line memories 73A and 73B and outputting the latched data to the frequency value detector 57. The number of steps of 15 has no special meaning, and the 15-stage latch circuit 74 may only have no excessive storage capacity. A histogram is produced from the data latched by the 15-stage latch circuit 74 (digital density value data for the last line) by the frequency value detector 57 to detect the density range of a peak similarly as in the second embodiment.

In the image processing apparatus of the present third embodiment having the construction described above, when the density range of a peak in the histogram detected by the frequency value detector 57 is a black area (when black image data are being read), the black level reference value from the black level setting section 54 is outputted to the analog to digital converter 2A by way of the change-over section 72, but when the density range of the peak in the histogram detected by the frequency value detector 57 is a red area (when red image data are being read), the change-over section 72 is changed over so that the red level reference value from the red level setting section 71 is now outputted to the analog to digital converter 2A, similarly as in the second embodiment.

Consequently, when red image data are being read, the white level reference value from the white level setting section 53 and the red level reference value from the red level setting section 71 are inputted to the analog to digital converter 2A, and the range between the white level reference value and the red level reference value is set as the predetermined conversion density range. A digital density value is thus obtained using a scale obtained by dividing the predetermined conversion density range by a number provided a predetermined number of bits (8 bits in the present embodiment) equal to that used for reading of a black character and is outputted from the analog to digital converter 2A to the binary digitization circuit 3A.

In this manner, with the image processing apparatus of the third embodiment of the present invention, when the density range of a peak in the histogram detected by the frequency value detector 57 is a red area, this is fed back to the change-over section 72 to change over the applicable reference, which has been inputted to the analog to digital converter 2A, from the black reference to the red reference. Consequently, when image data such as a character as an object for reading are red, a multi-value output of a density value is provided with reference to red, and even when color characters are present discretely in the original, sharp binary digitization processing which does not cause blurring or distortion can be performed. Consequently, the effect of automatic binary digitization method can be anticipated also for colored characters.

Further, since the image processing apparatus of the third embodiment does not require, different from the image processing apparatus of the second embodiment described hereinabove, such conversion means as a lookup table. It is advantageous in that the bit accuracy can be maintained and the construction is simplified comparing with the construction in the second embodiment and besides a high speed operation can be achieved.

It is to be noted that, while, in the embodiment described above, reading of a two-color original including a black character and a red character is described, where, for example, blue image data are involved in addition to red image data, similar advantages to those of the embodiment described above can be achieved by constructing the image processing apparatus such that a level reference value for blue image data is set and outputted to the analog to digital converter 2A in place of the black reference.

Further, while, in the image processing apparatus of the second and third embodiments described above, the black level setting section 54 including the black level follower 54A for following black characters on an actual original to correct and set the black reference and the digital to analog converter 54B is used in order to set the black reference, a black level setting section which is constructed to store and hold a black level reference value (black reference) used for reading a black reference plate may be used for such black level setting section.

The present invention is not limited to the specifically described embodiment, and variations and modifications may be made without departing from the scope of the present invention.

What is claimed is:

1. An image processing method which involves binary digitization processing wherein density values obtained from a sensor, which is provided for scanning image data in a main scanning direction and a perpendicular subscanning direction to detect a density value of the image data for each picture element, are compared for the individual picture elements with a threshold level to convert each of the density values into one of two binary values of white and black, comprising the steps of:

adding, when, upon such binary digitization processing, the density value of a noticed picture element is lower than the threshold level, a binary value error of a picture element on the opposite side to the noticed picture element in the main scanning direction or the sub scanning direction to the density value of the noticed picture element to obtain a sum value;

comparing the sum value with the threshold level; and outputting, when the sum value is equal to or higher than the threshold level, a black signal for the noticed picture element.

2. The image processing method as claimed in claim 1, wherein the binary value error is set to "0" when a binary digitization value of the picture element having the binary value error is a black signal, but when the binary digitization value of the picture element having the binary value error is a white signal, the binary value error is set to the density value of the picture element before binary digitization processing.

3. An image processing method which involves binary digitization processing wherein density values obtained from a sensor, which is provided for scanning image data in a main scanning direction and a perpendicular subscanning direction to detect a density value of the image data for each picture element, are compared for the individual picture elements with a threshold level to convert each of the density values into one of two binary values of white and black, comprising the steps of:

adding, when, upon such binary digitization processing, the density value of a noticed picture element is lower than the threshold level, a binary value error of a picture element on the opposite side to the noticed picture element in the main scanning direction to the density value of the noticed picture element to obtain a first sum value and adding another binary value error of another picture element on the opposite side to the noticed picture element in the sub scanning direction to the density value of the noticed picture element to obtain a second sum value;

comparing the first sum value and the second value with the threshold level; and outputting, when at least one of the first sum value and the second sum value is equal to or higher than the threshold level, a black signal for the noticed picture element.

4. The image processing method as claimed in claim 3, wherein the binary value error is set to "0" when a binary digitization value of the picture element having the binary value error is a black signal, but when the binary digitization value of the picture element having the binary value error is a white signal, the binary value error is set to the density value of the picture element before binary digitization processing.

5. The image processing method as claimed in claim 3, wherein the threshold level for comparison is set to different values for the first sum value and the second sum value.

6. The image processing method as claimed in claim 5, wherein the binary value error is set to "0" when a binary digitization value of the picture element having the binary value error is a black signal, but when the binary digitization value of the picture element having the binary value error is a white signal, the binary value error is set to the density value of the picture element before binary digitization processing.

7. An image processing apparatus, comprising:

a sensor for scanning image data in a main scanning direction and a perpendicular sub scanning direction to detect a density value of the image data for each picture element; and binary digitization means for comparing the density values obtained from said sensor for the individual picture elements with a threshold level to convert each of the density values into one of two binary values of white and black;

said binary digitization means including first comparison means for comparing the density value of a noticed picture element with the threshold level and outputting a black signal when the density value of the noticed picture element is equal to or higher than the threshold level, storage means for storing a binary value error of a picture element on the opposite side to the noticed picture element in the main scanning direction or the sub scanning direction, addition means for adding, when said first comparison means determines that the density value of the noticed picture element is lower than the threshold level, the binary value error stored in said storage means to the density value of the noticed picture element, second comparison means for comparing the result of addition by said addition means with the threshold level and outputting a black signal when the result of addition is equal to or higher than the threshold level; and a logical OR gate for logically ORing an output of said first comparison means and an output of said second comparison means with each other and outputting the result of logical ORing as a result of binary digitization processing.

8. The image processing apparatus as claimed in claim 7, wherein the binary value error is set to "0" when a binary digitization value of the picture element having the binary value error is a black signal, but when the binary digitization value of the picture element having the binary value error is a white signal, the binary value error is set to the density value of the picture element before binary digitization processing.

9. An image processing apparatus, comprising:

a sensor for scanning image data in a main scanning direction and a perpendicular sub scanning direction to detect a density value of the image data for each picture element; and binary digitization means for comparing the density values obtained from said sensor for the individual picture elements with a threshold level to convert each of the density values into one of two binary values of white and black;

said binary digitization means including first comparison means for comparing the density value of a noticed picture element with the threshold level and outputting a black signal when the density value of the noticed picture element is equal to or higher than the threshold level, first storage means for storing a binary value error of a picture element on the opposite side to the noticed picture element in the main scanning direction, second storage means for storing a binary value error of another picture element on the opposite side to the noticed picture element in the sub scanning direction, first addition means for adding, when said first comparison means determines that the density value of the noticed picture element is lower than the threshold level, the binary value error of the picture element on the opposite side to the noticed picture element in the main scanning direction stored in said first storage means to the density value of the noticed picture element, second addition means for adding, when said first comparison means determines that the density value of the noticed picture element is lower than the threshold level, the binary value error of the picture element on the opposite side to the noticed picture element in the sub scanning direction stored in said second storage means to the density value of the noticed picture element, second comparison means for comparing the result of addition by said first addition means with the threshold level and outputting a black signal when the result of addition is equal to or higher than the threshold level, third comparison means for comparing the result of addition by said second addition means with the threshold level and outputting a black signal when the result of addition is equal to or higher than the threshold level, and a logical OR gate for logically ORing an output of said first comparison means, an output of said second comparison means and an output of said third comparison means and outputting the result of logical ORing as a result of binary digitization processing.

10. The image processing apparatus as claimed in claim 9, wherein the binary value error is set to "0" when a binary digitization value of the picture element having the binary value error is a black signal, but when the binary digitization value of the picture element having the binary value error is a white signal, the binary value error is set to the density value of the picture element before binary digitization processing.

11. The image processing apparatus as claimed in claim 9, wherein the threshold level for comparison is set to different values for said second comparison means and said third comparison means.

12. The image processing apparatus as claimed in claim 11, wherein the binary value error is set to "0" when a binary digitization value of the picture element having the binary value error is a black signal, but when the binary digitization value of the picture element having the binary value error is a white signal, the binary value error is set to the density value of the picture element before binary digitization processing.

* * * * *